United States Patent
Kato et al.

(10) Patent No.: US 11,486,491 B2
(45) Date of Patent: Nov. 1, 2022

(54) SHIFT DEVICE FOR VEHICLE THAT INCLUDES A SHIFT LEVER AND A CONTROL LEVER THAT ARE SEPARATELY SUPPORTED BY A BASEPLATE

(71) Applicants: TOYOTA JIDOSHA KABUSHIKI KAISHA, Toyota (JP); KABUSHIKI KAISHA TOKAI RIKA DENKI SEISAKUSHO, Aichi (JP); TSUDA INDUSTRIES CO., LTD., Kariya (JP); MANNOH INDUSTRIAL CO., LTD., Anjo (JP)

(72) Inventors: Shori Kato, Tajimi (JP); Atsushi Toyama, Aichi-ken (JP); Takaaki Fukushima, Hekinan (JP); Naotaka Nishikawa, Anjo (JP)

(73) Assignees: TOYOTA JIDOSHA KABUSHIKI KAISHA, Toyota (JP); KABUSHIKI KAISHA TOKAI RIKA DENKI SEISAKUSHO, Aichi (JP); TSUDA INDUSTRIES CO., LTD., Kariya (JP); MANNOH INDUSTRIAL CO., LTD., Anjo (JP)

( * ) Notice: Subject to any disclaimer, the term of this patent is extended or adjusted under 35 U.S.C. 154(b) by 0 days.

(21) Appl. No.: 16/898,969

(22) Filed: Jun. 11, 2020

(65) Prior Publication Data
US 2021/0010587 A1    Jan. 14, 2021

(30) Foreign Application Priority Data
Jul. 11, 2019 (JP) .............................. JP2019-129591

(51) Int. Cl.
*F16H 59/10* (2006.01)
*F16H 61/22* (2006.01)
(Continued)

(52) U.S. Cl.
CPC ............. *F16H 59/10* (2013.01); *F16H 61/22* (2013.01); *F16H 61/24* (2013.01);
(Continued)

(58) Field of Classification Search
CPC .......... F16H 59/10; F16H 61/22; F16H 61/24; F16H 61/0204; F16H 61/0208;
(Continued)

(56) References Cited

U.S. PATENT DOCUMENTS 3,465,612 A * 9/1969 Letwin ................... F16H 59/02
74/473.33
5,899,115 A * 5/1999 Kataumi ............. F16H 59/0204
74/473.18
(Continued)

FOREIGN PATENT DOCUMENTS

| EP | 0721073 A2 * | 7/1996 | ............ F16H 59/04 |
|---|---|---|---|
| JP | 08132911 A * | 5/1996 | |
| JP | 2010-280348 A | 12/2010 | |
| JP | 5203443 B2 * | 6/2013 | |

*Primary Examiner* — Jake Cook
*Assistant Examiner* — T. Scott Fix
(74) *Attorney, Agent, or Firm* — Sughrue Mion, PLLC

(57) ABSTRACT

A shift device for a vehicle includes a baseplate, a shift lever having a spherical shaft part at a lower end, and a control lever connected to the shift lever. The spherical shaft part of the shift lever is supported by the baseplate and configured to turn relative to the baseplate. A cable coupling part is provided at an upper part of the control lever. A turning shaft part supported by the baseplate is provided at a lower part of the control lever outward of the spherical shaft part of the shift lever in a vehicle width direction, and the turning shaft part is configured to turn relative to the baseplate. The control lever has a branched part between the cable coupling part and the turning shaft parts, and the branched part is located above the spherical shaft part and branched in the vehicle width direction.

10 Claims, 20 Drawing Sheets

(51) Int. Cl.
*F16H 61/24* (2006.01)
*F16H 59/02* (2006.01)

(52) U.S. Cl.
CPC ............. *F16H 2059/0269* (2013.01); *F16H 2061/242* (2013.01); *F16H 2061/247* (2013.01)

(58) Field of Classification Search
CPC ..... F16H 2059/0269; F16H 2059/0221; F16H 2061/242; F16H 2061/247; B60K 20/02; B60K 20/04; G05G 7/12; G05G 9/10; G05G 2009/04707; B60T 7/102; B60T 7/104; B60T 7/105; B60T 7/108; B62L 3/02
USPC ...................................... 74/473.21
See application file for complete search history.

(56) References Cited

U.S. PATENT DOCUMENTS

| | | | |
|---|---|---|---|
| 6,230,579 B1* | 5/2001 | Reasoner | F16H 59/0204 74/473.18 |
| 9,441,730 B2* | 9/2016 | Kim | F16H 59/0204 |
| 2007/0137366 A1* | 6/2007 | Esaki | F16H 59/0278 74/473.26 |
| 2008/0178699 A1* | 7/2008 | Kubota | F16H 59/10 74/473.36 |
| 2013/0307277 A1* | 11/2013 | Rosenvard | F03D 13/25 290/55 |
| 2014/0007728 A1* | 1/2014 | Kim | F16H 61/688 74/473.12 |

\* cited by examiner

SHIFT DEVICE FOR VEHICLE THAT INCLUDES A SHIFT LEVER AND A CONTROL LEVER THAT ARE SEPARATELY SUPPORTED BY A BASEPLATE

INCORPORATION BY REFERENCE

The disclosure of Japanese Patent Application No. 2019-129591 filed on Jul. 11, 2019 including the specification, drawings and abstract is incorporated herein by reference in its entirety.

BACKGROUND

1. Technical Field

The present disclosure relates to a shift device for a vehicle. In particular, the present disclosure relates to improvement of a member constituting a part of a shift device for a vehicle.

2. Description of Related Art

A shift device by which a driver performs shifting operation is provided inside a cabin of a vehicle equipped with a transmission, such as an automatic transmission. As disclosed in Japanese Patent Application Publication No. 2010-280348 (JP 2010-280348 A), for example, this type of shift device includes a baseplate (which is called a device main body in JP 2010-280348 A) supported by a vehicle body, a shift lever having a spherical shaft part that is provided at a lower end and turnably supported, and a control lever (which is called a transmission switching member in JP 2010-280348 A) that transmits an operating force input into the shift lever by a driver to a transmission (e.g., a valve provided in a hydraulic circuit of the transmission) through a cable.

The control lever has a cable coupling part to which one end portion of the cable is coupled and turning shaft parts that are turnably supported by the baseplate.

The control lever disclosed in JP 2010-280348 A is further provided with a lever holding part that turnably supports the spherical shaft part of the shift lever, and the turning shaft parts are integrally provided on both sides of the lever holding part in a vehicle width direction.

SUMMARY

As described above, the control lever disclosed in JP 2010-280348 A has the turning shaft parts integrally provided on both sides of the lever holding part in the vehicle width direction. The lever holding part has a space inside into which the spherical shaft part is fitted, and is provided with a plurality of slits so as to be elastically deformed when fitting the spherical shaft part. This means that the lever holding part is a relatively low-rigidity part. In the configuration disclosed in JP 2010-280348 A, therefore, the rigidity for supporting the turning shaft parts is probably low.

In this configuration, a reaction force to an operating force when the shift lever is operated acts on each turning shaft part through the spherical shaft part and the lever holding part of the control lever. Being supported with low rigidity, the turning shaft parts may be deformed (bent) by this reaction force such that a centerline (axis) extending between the turning shaft parts curves. Such deformation would add to resistance to turning the control lever, which may result in degradation of the operability of the shift lever or wear on the shift lever due to an increase in local contact pressure.

A possible measure to reduce the amount of deformation of the turning shaft parts is to increase the distance between the turning shaft parts. However, this configuration makes the control lever larger and is therefore not practical.

A possible measure to mitigate the wear is to increase the inside diameters of support holes of the baseplate in which the turning shaft parts are supported to thereby reduce the resistance to turning. However, this configuration may cause rattling of the turning shaft parts. To mitigate this rattling, the rigidity to withstand the reaction force to the operating force can be secured, for example, by increasing the thickness of a lower-side part of the lever holding part, but this makes the control lever larger as well as the entire shift device heavier and is therefore not practical.

The present disclosure provides a shift device for a vehicle that can reduce the resistance to turning a control lever and thereby enhance the operability of a shift lever and mitigate local wear on the shift lever, without making the control lever larger or heavier.

A first aspect of the present disclosure is a shift device for a vehicle. This shift device for a vehicle includes a baseplate supported by a vehicle body, a shift lever having a spherical shaft part at a lower end, and a control lever connected to the shift lever. The control lever is configured to transmit an operating force input into the shift lever in a vehicle body front-rear direction to a transmission through a cable. The spherical shaft part of the shift lever is supported by the baseplate and configured to turn relative to the baseplate. A cable coupling part to which the cable is coupled is provided at an upper part of the control lever. A turning shaft part supported by the baseplate are provided at a lower part of the control lever outward of the spherical shaft part of the shift lever in a vehicle width direction, and the turning shaft part is configured to turn relative to the baseplate. The control lever has a branched part between the cable coupling part and the turning shaft parts. The branched part is located above the spherical shaft part and branched in the vehicle width direction so as to extend toward the turning shaft parts.

In the first aspect, a pair of turning shaft parts may be located at the lower part of the control lever on both outer sides of the spherical shaft member in the vehicle width direction. A centerline connecting turning centers of the pair of the turning shaft parts may pass through a center of the spherical shaft member.

When the shift lever is operated by the driver (in the vehicle body front-rear direction), the shift lever turns around the spherical shaft part, which is supported by the baseplate and configured to turn relative to the baseplate, as the center of turning and transmits the operating force to the control lever. Upon receiving this operating force, the control lever turns around the turning shaft parts, which are supported by the baseplate and configured to turn relative to the baseplate, as the center of turning and transmits the operating force to the transmission through the cable coupled to the cable coupling part. Thus, an action of shifting the transmission (an action of switching a travel range etc.) is performed.

The spherical shaft part of the shift lever and the turning shaft parts of the control lever are separately supported by the baseplate. Specifically, the control lever has the branched part that is branched in the vehicle width direction above the spherical shaft part so as to extend toward the turning shaft parts, and the turning shaft parts are supported by parts of the baseplate separate from a part that supports the spherical shaft part, on the lateral sides of the spherical shaft part in the vehicle width direction, and are configured to turn relative to the baseplate. Thus, a reaction force to an operating force when the shift lever is operated does not directly act on the turning shaft parts of the control lever. It is therefore less likely that the turning shaft parts will deform due to this reaction force such that a centerline extending between the two turning shaft parts curves. In the first aspect, such deformation is less likely to add to the resistance to turning the control lever, so that degradation of the operability of the shift lever and wear on the shift lever due to an increase in local contact pressure can be avoided. Since there is no need to increase the distance between the turning shaft parts to reduce the amount of deformation of the turning shaft parts, the size of the control lever can be kept down. Moreover, since there is no need to increase the inside diameters of support holes of the baseplate in which the turning shaft parts are supported to reduce the resistance to turning, the turning shaft parts can be kept from rattling.

In the first aspect, the shift lever and the control lever may be connected to each other so that an engaging projection formed on the control lever is inserted and engaged into an engaging opening formed in the shift lever. A protruding direction of the engaging projection formed on the control lever and a protruding direction of the cable coupling part may be opposite directions. A position at which the engaging projection is engaged in the engaging opening, the position of the spherical shaft part, and the position of the cable coupling part may be located in the same plane.

In this configuration, the position at which the engaging projection is engaged in the engaging opening and the position of the cable coupling part are located in the same plane, so that torsion of the control lever due to an operating force from the shift lever can be mitigated. Moreover, the position at which the engaging projection is engaged in the engaging opening and the position of the spherical shaft part are located in the same plane, so that torsion input into the spherical shaft part can be reduced. Since the protruding direction of the engaging projection and the protruding direction of the cable coupling part are opposite directions, the side toward which the engaging projection moves out of the engaging opening (e.g., when a travel mode is changed) and the side on which the work of mounting the cable to the cable coupling part is performed are the same side. Thus, a space around the control lever can be effectively used, and the physical size of the shift device can be reduced.

In the first aspect, a centerline extending from the turning shaft parts of the control lever along the vehicle width direction may pass through the center of the spherical shaft part. A central portion of the cable coupling part and the position at which the engaging projection is engaged in the engaging opening may be located in or near an imaginary plane that passes through the center of the spherical shaft part and extends along a vehicle body front-rear direction.

In this configuration, when the shift lever is operated, the spherical shaft part turns around a point on the centerline of the turning shaft parts of the control lever. Thus, an angle to which the shift lever is operated matches an angle to which the control lever turns, so that the shift lever and the control lever do not shift relative to each other. This allows for good operability of the shift lever. Since the central portion of the cable coupling part and the position at which the engaging projection is engaged in the engaging opening are located in or near the imaginary plane that passes through the center of the spherical shaft part and extends along the vehicle body front-rear direction, the force acting on the control lever in a direction of torsion can be reduced as described above.

In the first aspect, the baseplate may be provided with a gate having an opening that guides shifting operation of the shift lever. A cushion member that is a part separate from the baseplate and made of a material softer than a material composing the baseplate may be installed along an edge of the opening of the gate. The shift lever may be provided with a detent pin configured to move upward and downward and constituting a detent mechanism that functions to position the shift lever at each shift position of the shift lever. The cushion member may have a detent cushion that extends downward so as to come into contact with the detent pin in a state where the detent pin has reached a raised position. The detent cushion may have an engaging projection that engages with the baseplate and an opening that is formed above the engaging projection.

In this configuration, when the detent mechanism is activated and the detent pin reaches the raised position, the detent pin comes into contact with the detent cushion of the cushion member. Since this cushion member is made of a soft material, the impact of the detent pin coming into contact with the detent cushion of the cushion member is absorbed as the detent cushion deforms elastically. The opening is formed above the engaging projection in the detent cushion, and thus a portion of the detent cushion around this opening is fragile. Therefore, this portion can undergo a large amount of elastic deformation, which also contributes to effectively absorbing the impact. For these reasons, the impact noise of the detent pin coming into contact with the detent cushion of the cushion member can be reduced, and a load input into the detent pin upon contact can also be reduced. As a result, it is possible to keep the detent mechanism quiet during operation and enhance the durability of the detent mechanism.

In the above configuration, the cushion member is produced as a part separate from the baseplate and installed along the edge of the opening of the gate of the baseplate. This production method can reduce the manufacturing cost compared with a common method in which a cushion member and a baseplate are integrally produced (a cushion member made of a different material from a baseplate is integrally molded inside the baseplate).

In the first aspect, the baseplate may be provided with an insertion hole into which the detent cushion of the cushion member is inserted, and a clearance may be left between a vertical wall forming an inner surface of the insertion hole and a side surface of the detent cushion facing the vertical wall.

In this configuration, since the clearance is left, a space in which the detent cushion can deform elastically when the detent pin comes into contact with the detent cushion is secured. Specifically, when the detent pin having reached the raised position comes into contact with the detent cushion of the cushion member, an upward load acts on the detent cushion, and this load is absorbed as the detent cushion deforms elastically so as to fill the clearance. This also contributes to reducing the impact noise of the detent pin coming into contact with the detent cushion of the cushion member, as well as to reducing the load input into the detent pin. As a result, it is possible to keep the detent mechanism quiet during operation and enhance the durability of the detent mechanism.

In the first aspect, an outer circumferential edge of the turning shaft part of the control lever may have a perfectly circular shape as seen from the vehicle width direction. The baseplate may be formed by integrally combining an upper baseplate having an upper support part that supports the turning shaft part along the upper side of the outer circumferential edge, and a lower baseplate having a lower support part that supports the turning shaft parts along the lower side of the outer circumferential edge. At least one of the upper support parts of the upper baseplate and the lower support parts of the lower baseplate may have a circular arc shape matching the shape of the outer circumferential edge of the turning shaft part as seen from the vehicle width direction. The lower baseplate may be provided with a temporary holding part on which, before the spherical shaft part of the shift lever is installed, the control lever that has been turned toward one side so as to be away from an installation path of installing the spherical shaft part is placed and temporarily held.

In this configuration, the outer circumferential edge of each turning shaft part of the control lever has a perfectly circular shape as seen from the vehicle width direction, and at least either the upper support parts of the upper baseplate or the lower support parts of the lower baseplate have a circular arc shape matching the shape of the outer circumferential edge of the turning shaft part as seen from the vehicle width direction. Thus, a large area of contact between each turning shaft part and the support part (the support part having a circular arc shape) can be secured. This means that a contact pressure on each of outer circumferential surfaces of the turning shaft parts and inner circumferential surfaces of the support parts (a load acting thereon per unit area) can be reduced, and that wear on these outer circumferential surfaces of the turning shaft parts and these inner circumferential surfaces of the support parts can be mitigated.

In the above configuration, to install the spherical shaft part of the shift lever onto the lower baseplate, the control lever is turned toward one side so as to be away from the installation path of the shift lever, and the control lever is placed and temporarily held on the temporary holding part provided in the lower baseplate. Thus, the work of installing the spherical shaft part can be efficiently performed, without the control lever getting in the way during the work of installing the spherical shaft part.

In the first aspect, each of the upper baseplate and the lower baseplate may be provided with a mating wall in which a pin hole is formed, and the upper baseplate and the lower baseplate may be integrally combined so that each of the mating walls is overlapped with each other and an engaging pin is passed through each of the pin holes. One of the mating wall of the upper baseplate and the mating wall of the lower baseplate that is located on the outer side in a pin passing direction may be integrally provided with a pin slip-out preventing piece extending in a direction along an extension direction of the mating wall. The pin slip-out preventing piece may be configured to bend in a direction orthogonal to an insertion direction of the engaging pin, between a position away from the engaging pin and a position covering an end surface of the engaging pin, and press the end surface of the engaging pin in a state where the engaging pin has been passed through the pin holes.

In this configuration, if the pin slip-out preventing piece that presses the end surface of the engaging pin extends in a direction orthogonal to the extension direction of the mating wall (in the insertion direction of the engaging pin) (as in a related art), the dimension of the mating wall in the insertion direction of the engaging pin is increased by the length of the pin slip-out preventing piece (the dimension thereof in the direction orthogonal to the extension direction of the mating wall). This results in an increase in the size of the baseplate. In the solution adopted by the present disclosure, by contrast, the pin slip-out preventing piece extends in the direction along the extension direction of the mating wall, and is configured to bend in the direction orthogonal to the insertion direction of the engaging pin, between the position away from the engaging pin and the position covering the end surface of the engaging pin. Thus, the dimension of the pin slip-out preventing piece in the insertion direction of the engaging pin can be reduced, and the size of the baseplate can be reduced.

In the first aspect, the shift lever may be provided with a detent pin configured to move upward and downward and constituting a detent mechanism that functions to position the shift lever at each shift position of the shift lever. A shift lock unit that restricts movement of the shift lever by restricting upward and downward movement of the detent pin may be installed on the baseplate. A shift lock case of the shift lock unit may be provided with a boss that extends in a horizontal direction so as to support a shift lock link that restricts upward and downward movement of the detent pin by coming into contact with the detent pin in a shift lock state where movement of the shift lever is restricted, and the shift lock link may be configured to turn relative to the boss. The baseplate may be provided with a boss receiving part on which the boss is placed and supported. A part of the boss that comes into contact with the boss receiving part may be formed by a flat surface, and the boss receiving part may be formed by a protrusion having a flat surface on which the flat surface of the boss is laid.

In the shift lock state where movement of the shift lever is restricted, upward and downward movement of the detent pin is restricted as the shift lock link turnably supported by the boss provided on the shift lock case comes into contact with the detent pin. In this case, the detent pin may press the shift lock link, and the pressing force is input into the boss of the shift lock case through the shift lock link. In the above configuration, the part of the boss that comes into contact with the boss receiving part is formed by a flat surface, and the boss receiving part is formed by the protrusion having a flat surface on which the flat surface of the boss is laid. Thus, the pressing force is borne by a part at which the respective flat surfaces of the boss and the boss receiving part are laid one on top of the other, and therefore a sufficient capacity for bearing the pressing force is secured. Since the contact surfaces of the boss and the boss receiving part are the flat surfaces, good dimensional accuracy can be achieved compared with a related art in which contact surfaces of a boss and a boss receiving part are circular arc-shaped surfaces. Moreover, since the boss receiving part is formed by the protrusion having the flat surface, deformation during molding can be mitigated, which also contributes to high dimensional accuracy.

The first aspect of the present disclosure can prevent a reaction force to an operating force when the shift lever is operated from directly acting on the turning shaft parts of the control lever, thus making it less likely that the turning shaft parts will deform due to this reaction force. As a result, such deformation is less likely to add to the resistance to turning the control lever, so that degradation of the operability of the shift lever and wear on the shift lever due to an increase in local contact pressure can be avoided. Since there is no need to increase the distance between the turning shaft parts to reduce the amount of deformation of the turning shaft parts, the size of the control lever can be kept down. Moreover, since there is no need to increase the inside diameters of the support holes of the baseplate in which the turning shaft parts are supported to reduce the resistance to turning, the turning shaft parts can be kept from rattling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below based on the drawings. In this embodiment, a case will be described where the present disclosure is applied to a shift device provided in a vehicle equipped with an automatic transmission capable of switching between an automatic mode and a manual mode. However, the present disclosure is also applicable to a shift device provided in a vehicle equipped with an automatic transmission that does not have a manual mode.

Overall Configuration of Shift Device

Figure 1:
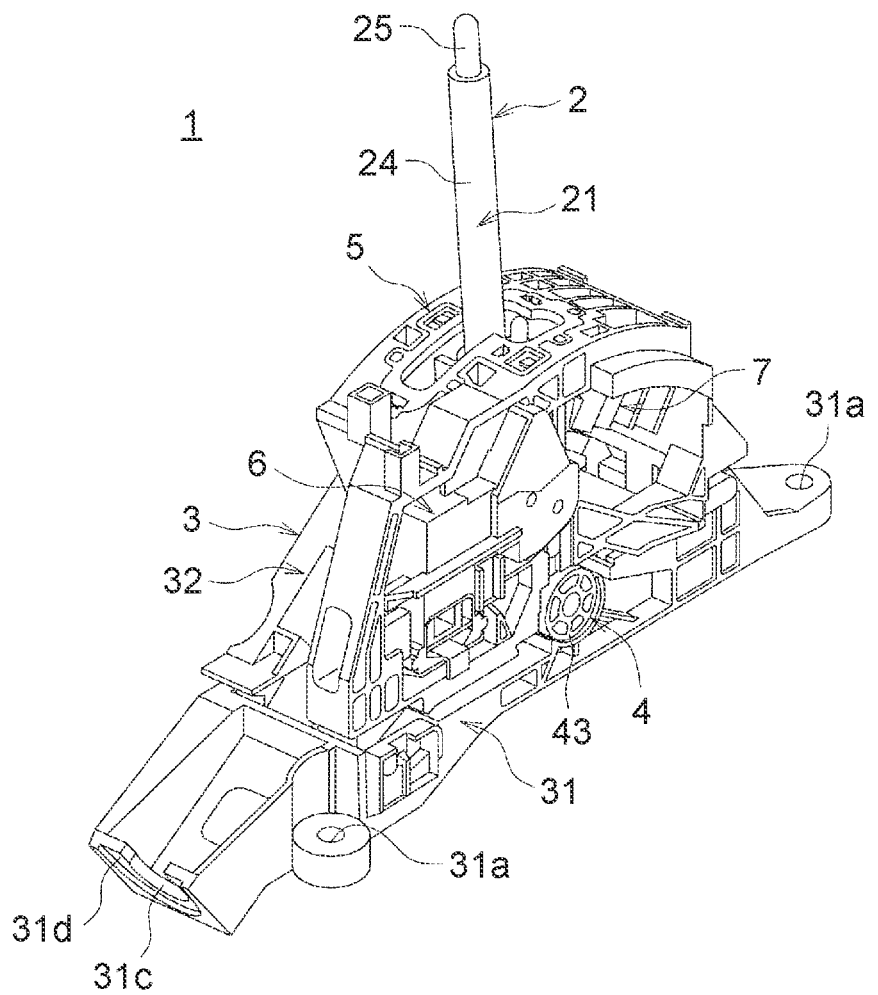
FIG. 1 is a perspective view of a shift device according to an embodiment.
Figure 1:
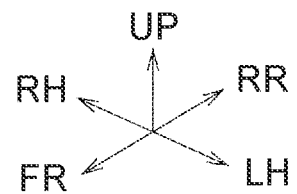
Figure 2:
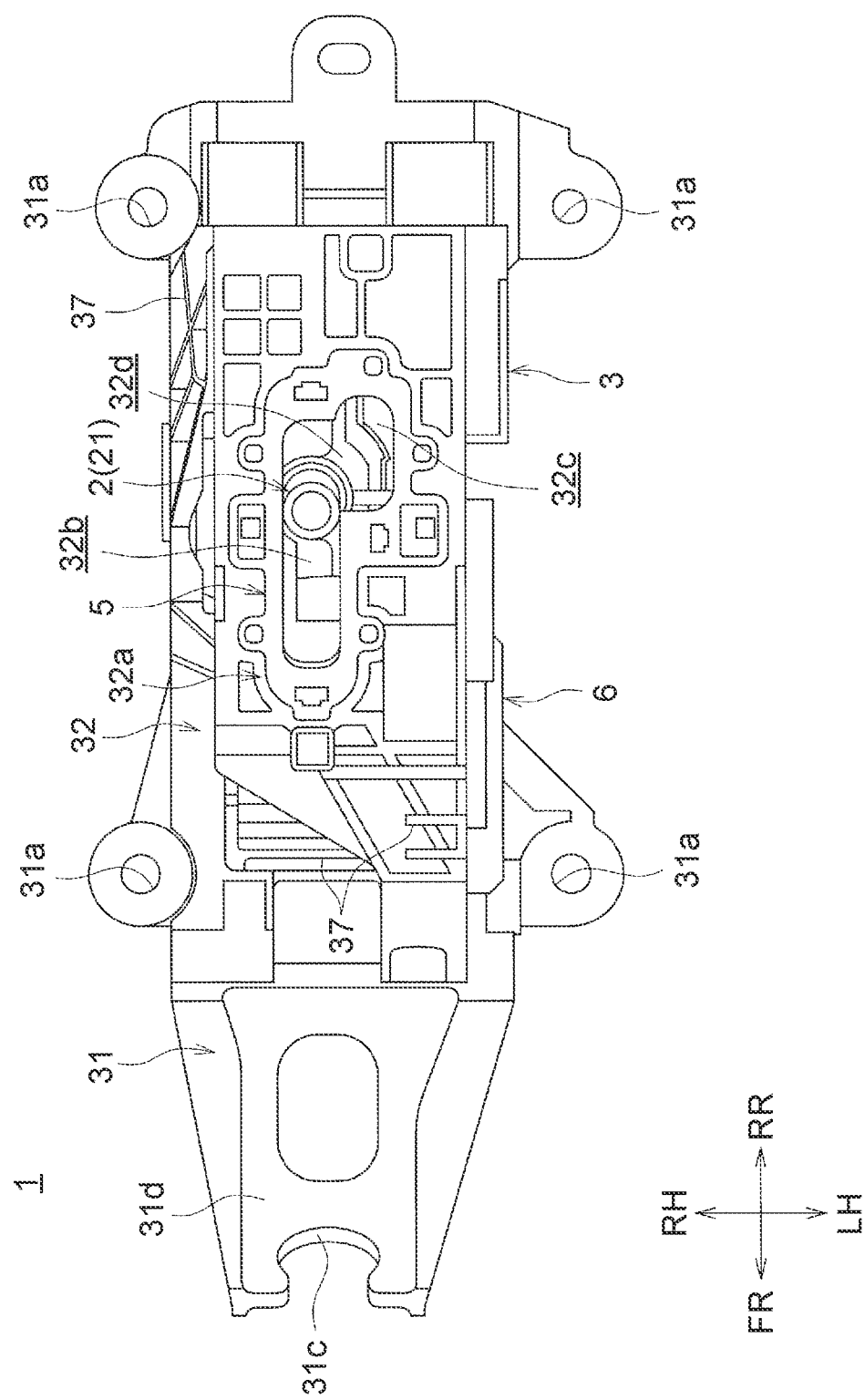
FIG. 2 is a plan view of the shift device according to the embodiment.
Figure 3:
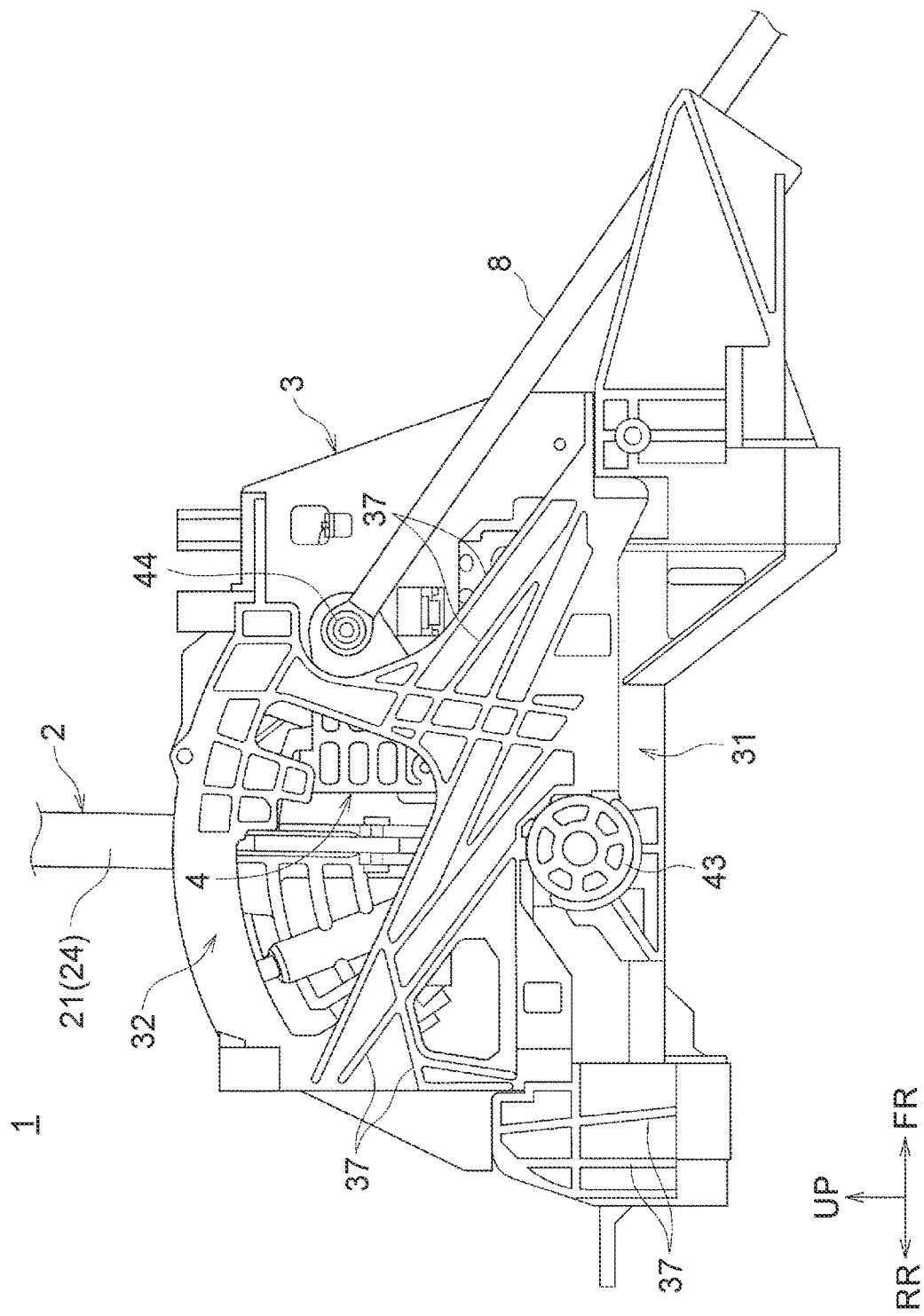
FIG. 3 is a right side view of the shift device according to the embodiment.
Figure 4:
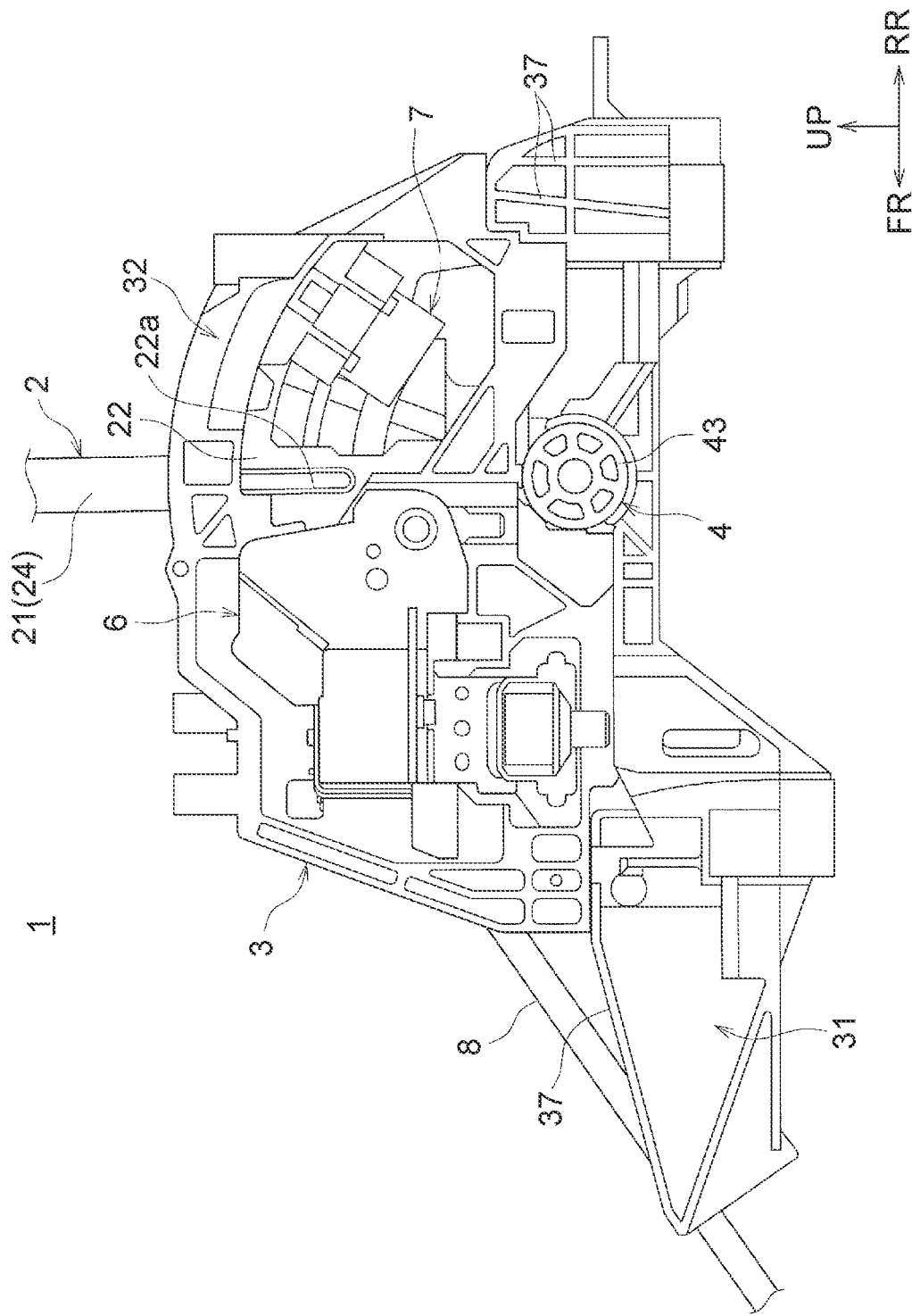
FIG. 4 is a left side view of the shift device according to the embodiment.
Figure 5:
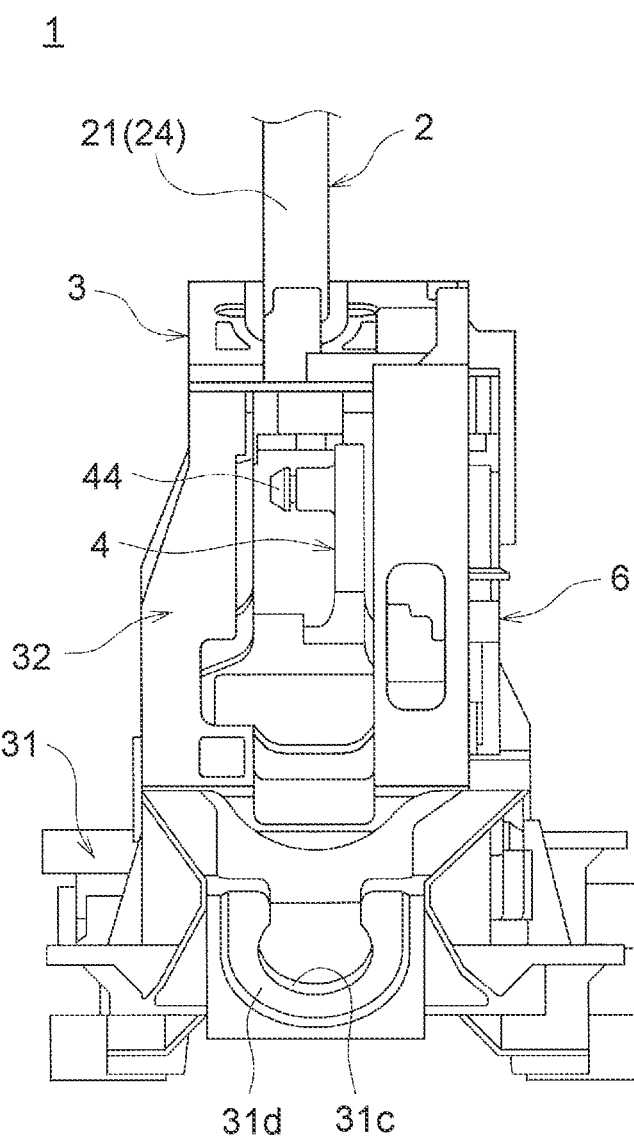
FIG. 5 is a front view of the shift device according to the embodiment.
Figure 5:
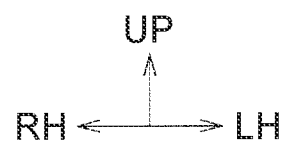
Figure 6:
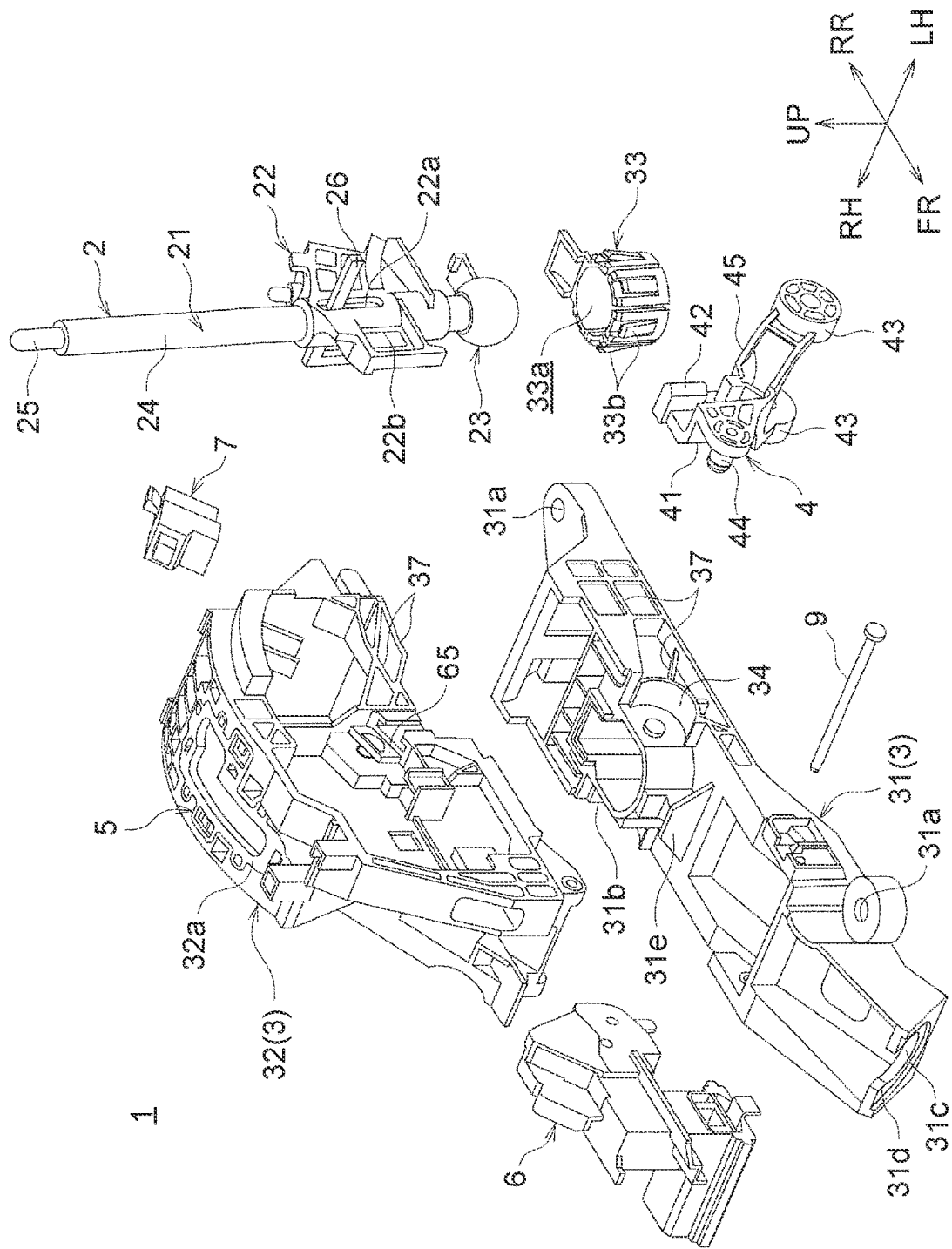
FIG. 6 is an exploded perspective view of the shift device according to the embodiment.

FIG. 1 is a perspective view of a shift device 1 according to the embodiment. FIG. 2 is a plan view of the shift device 1. FIG. 3 is a right side view of the shift device 1. FIG. 4 is a left side view of the shift device 1. FIG. 5 is a front view of the shift device 1. FIG. 6 is an exploded perspective view of the shift device 1.

The arrows FR, RR, UP, LH, and RH in these drawings indicate a vehicle body frontward direction, a vehicle body rearward direction, an upward direction, a vehicle body leftward direction, and a vehicle body rightward direction, respectively. The shift device 1 is configured as a so-called floor shift device that is provided in a center console part on a lateral side of a driver's seat.

As shown in FIG. 1 to FIG. 6, components of the shift device 1 according to the embodiment include a shift lever 2, a baseplate 3, a control lever 4, a shift gate cushion 5, a shift lock unit 6, and a manual-mode selection switch 7. Each member will be described below.

Shift Lever

The shift lever 2 is an operating member that is gripped by a driver to perform shifting operation. As shown in FIG. 6, components of the shift lever 2 include a lever main body 21, a lever engaging member 22, and a spherical shaft member (the "spherical shaft part" as termed in the present embodiment) 23.

The lever main body 21 has a hollow lever pipe 24, and a detent rod 25 that activates a detent mechanism (a detent mechanism that functions to position the shift lever 2 at each shift position of the shift lever 2) to be described later is housed inside the lever pipe 24 so as to be movable in an up-down direction. A shift knob (not shown) is mounted at an upper part of the lever pipe 24, and pressing down a shift knob switch provided in this shift knob causes the detent rod 25 to move downward inside the lever pipe 24 (when shift lock is not provided by the shift lock unit 6).

A detent pin 26 is connected to the detent rod 25. The detent pin 26 can engage in grooves of a detent plate (not shown) of the detent mechanism that correspond to the respective shift positions. To move the detent pin 26 between a P (parking) groove and an R (reverse) groove (move the shift lever 2 between a P-range position and an R-range position), and to move the detent pin 26 from an N (neutral) groove to the R (reverse) groove (move the shift lever 2 from an N-range position to the R-range position), it is necessary to press down the shift knob switch and move the detent pin 26 downward along with the detent rod 25 so as to remove the detent pin 26 from the corresponding groove. The configuration of this detent mechanism is commonly known and therefore will not be described in detail here.

The lever engaging member 22 is a member that holds the lever main body 21 at a lower part (a part slightly above a lower end) and engages with the control lever 4 to be described later. Specifically, the lever engaging member 22 is provided with an opening through which the lever main body 21 is passed, and the lever main body 21 is integrally installed on the lever engaging member 22 in a state where the lower part of the lever main body 21 is passed through this opening. The lever engaging member 22 has an elongated hole 22a that allows the detent pin 26 to move downward. Further, the lever engaging member 22 is provided with an engaging opening 22b by which the control lever 4 to be described later is engaged. The engaging opening 22b is formed as a substantially rectangular opening bored in the vehicle width direction. As a part of the control lever 4 (an engaging projection 42 of the control lever 4 to be described later) is inserted into the engaging opening 22b, the control lever 4 is engaged, so that an operating force input into the shift lever 2 is transmitted to the control lever 4.

The spherical shaft member 23 is a substantially spherical member mounted at the lower end of the lever main body 21. The spherical shaft member 23 has an opening into which the lower end of the lever main body 21 is inserted, and the lever main body 21 is integrally installed on the spherical shaft member 23 in a state where the lower end of the lever main body 21 (a lower end of the lever pipe 24) is inserted into this opening. The spherical shaft member 23 is a member with a predetermined outside diameter that is turnably supported by a lever holding member 33 to be described later that is one of constituent members of the baseplate 3.

Baseplate

The baseplate 3 is formed by integrally combining a lower baseplate 31, an upper baseplate 32, and the lever holding member 33.

The lower baseplate 31 is a member that is installed on and supported by a vehicle body (e.g., a floor panel). Bolt pass-through holes 31a (see FIG. 2) through which bolts for installing the lower baseplate 31 onto the vehicle body are passed are formed at a plurality of positions in the lower baseplate 31.

A lever holding member fitting part 31b by which the lever holding member 33 is integrally incorporated is provided at a central part of the lower baseplate 31. The lever holding member fitting part 31b is formed as a recessed part with a shape substantially matching the outer shape of the lever holding member 33, and the lever holding member 33 is fitted into the lever holding member fitting part 31b from above and thereby mounted so as not to come off.

An opening 31c (see FIG. 2 and FIG. 5) is provided at a vehicle body front-side part of the lower baseplate 31, and a cable 8 (see FIG. 3 and FIG. 4) coupled to a cable coupling part 44 of the control lever 4 to be described later is passed through the opening 31c. The opening 31c is provided in a vertical wall 31d at a leading end of the lower baseplate 31 and opens at an upper side.

The upper baseplate 32 is a member that is installed on an upper side of the lower baseplate 31. In a state where the upper baseplate 32 is installed on the lower baseplate 31, a lower-side part of the shift lever 2 (a lower part of the lever main body 21, the lever engaging member 22, and the spherical shaft member 23), the lever holding member 33, the control lever 4, the shift lock unit 6, and the manual-mode selection switch 7 are housed in a space formed between the lower baseplate 31 and the upper baseplate 32.

Each of the lower baseplate 31 and the upper baseplate 32 is provided with reinforcing ribs 37 at some positions to secure sufficient rigidity. This design can secure sufficient rigidity without increasing the thickness of the lower baseplate 31 and the upper baseplate 32.

As shown in FIG. 2, the upper baseplate 32 is provided with a gate 32a having gate openings 32b, 32c, 32d through which the lever main body 21 of the shift lever 2 is passed. Shifting operation of the shift lever 2 is performed such that the lever main body 21 moves along the gate openings 32b, 32c, 32d of the gate 32a, and thereby an action of shifting the automatic transmission (an action of switching a travel range etc.) is performed. Since the automatic transmission according to this embodiment is capable of switching between the automatic mode and the manual mode, the gate 32a includes the automatic-mode gate opening 32b and the manual-mode gate opening 32c. In the automatic-mode gate opening 32b, the P-range position, R-range position, N-range position, and D-range position are set from a vehicle body front side. The manual-mode gate opening 32c communicates with the automatic-mode gate opening 32b through the gate communication opening (gate opening) 32d, and a plus operation position for upshifting the gear stage and a minus operation position for downshifting the gear stage are set in the manual-mode gate opening 32c.

As shown in FIG. 6, the lever holding member 33 has a space 33a inside into which the spherical shaft member 23 is fitted, and a plurality of elastically deformable holding pieces 33b is provided on an outer side of the space 33c. To fit the spherical shaft member 23 into the lever holding member 33, the spherical shaft member 23 is pressed into the lever holding member 33, so that the spherical shaft member 23 is fitted into the space 33a while pushing the holding pieces 33b outward. Then, the holding pieces 33b return to their original shape, so that the spherical shaft member 23 is turnably supported while being prevented from slipping out of the lever holding member 33.

Control Lever

The control lever 4 is a member that transmits an operating force input into the shift lever 2 by a driver in a vehicle body front-rear direction to the transmission (e.g., a valve provided in a hydraulic circuit of the transmission) through the cable 8.

Figure 7:
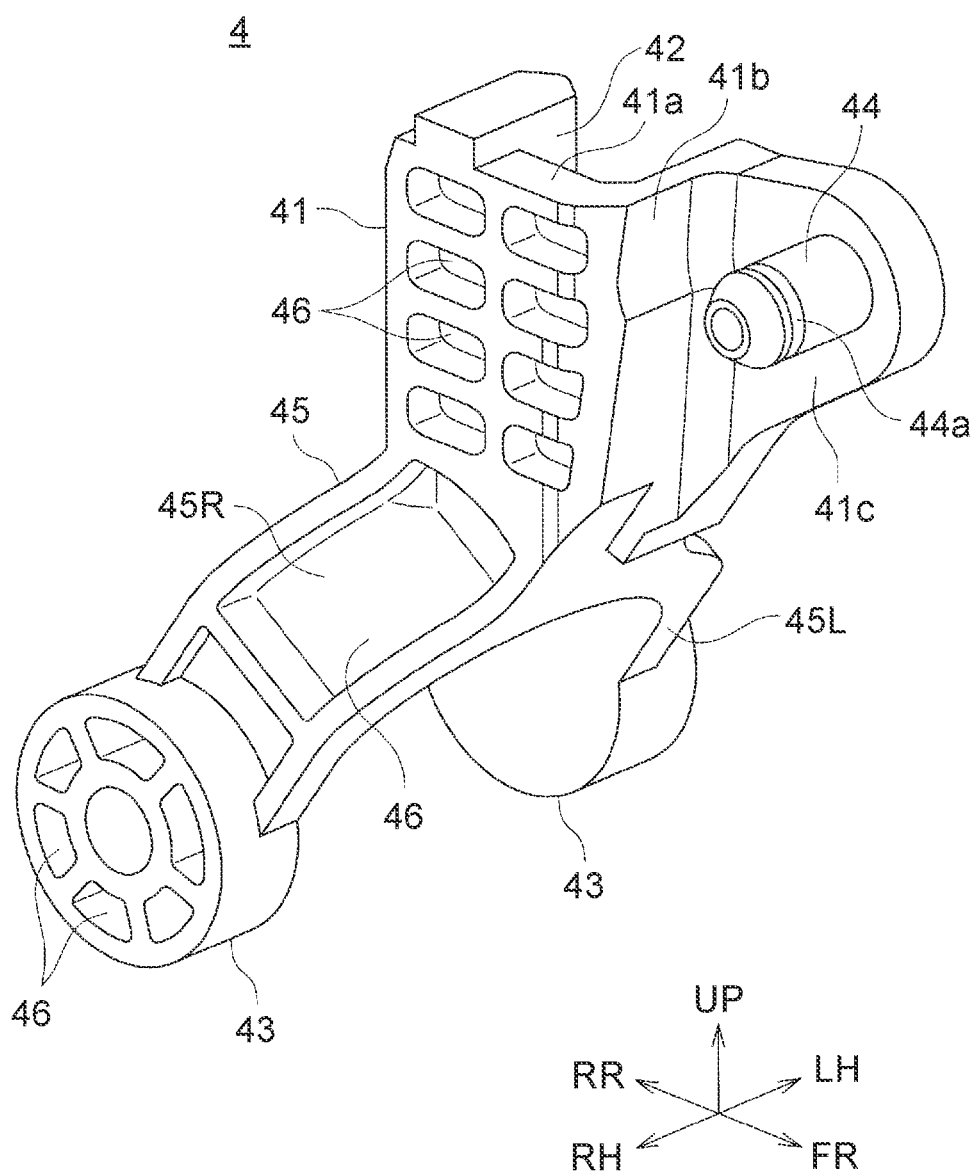
FIG. 7 is a perspective view of a control lever.
Figure 8:
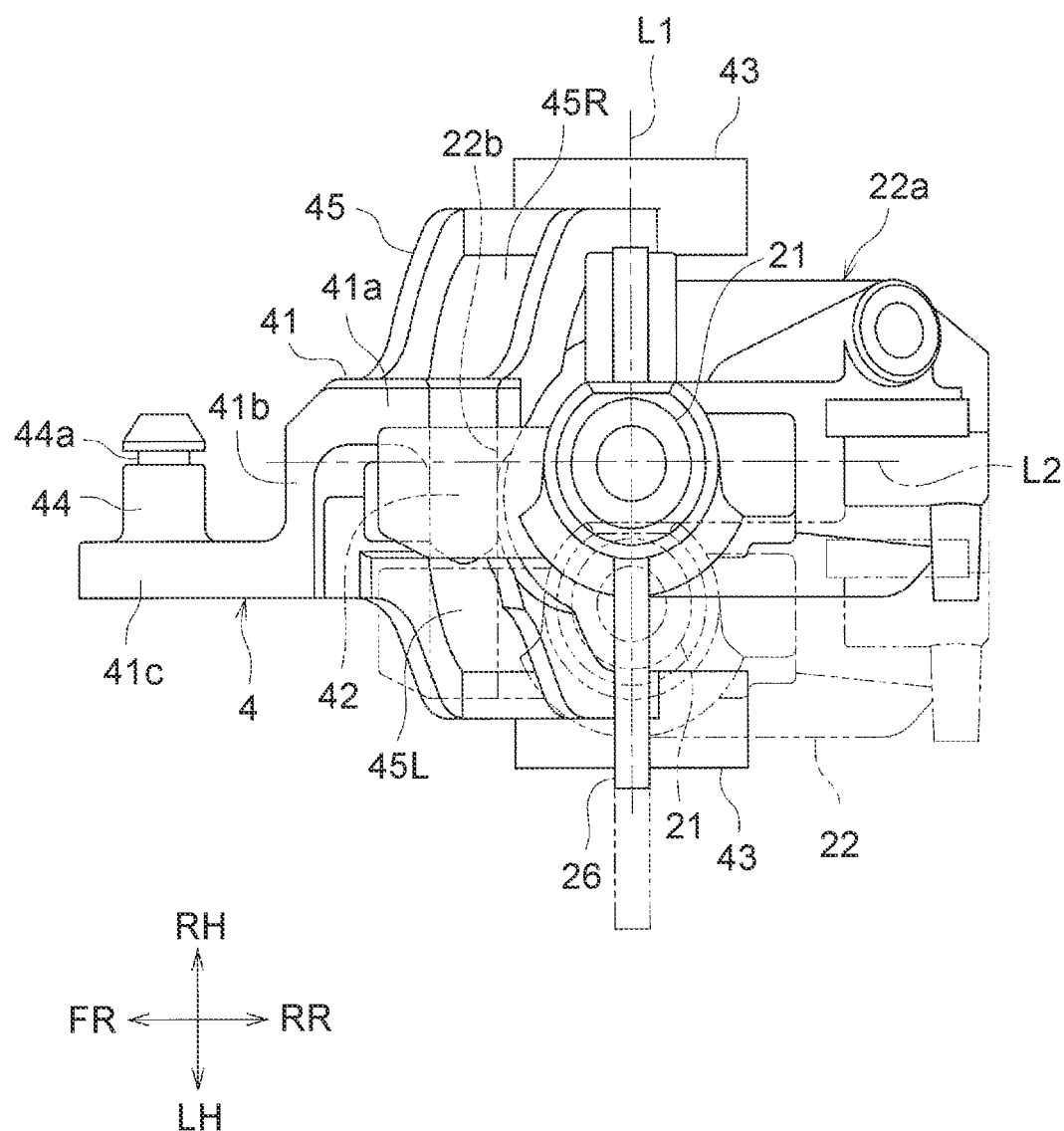
FIG. 8 is a plan view showing an engaged state of a shift lever and the control lever.
Figure 9:
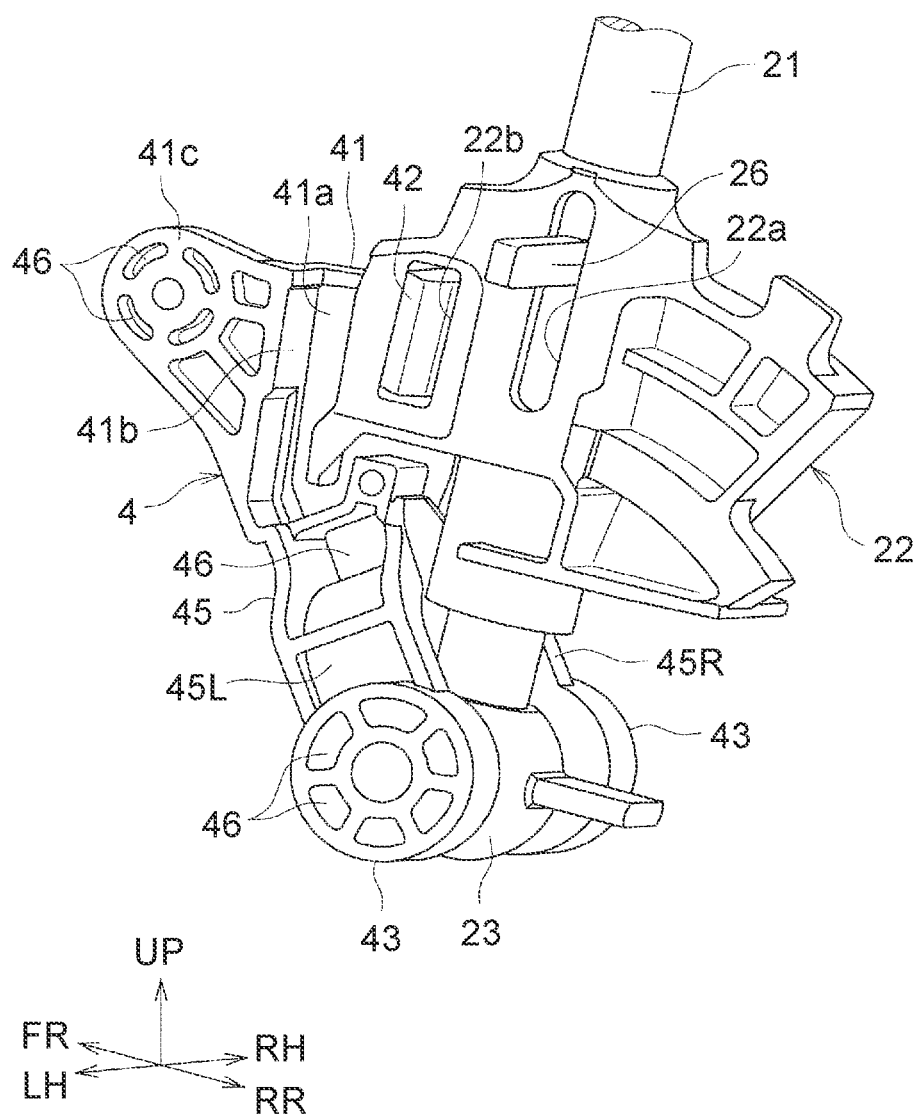
FIG. 9 is a perspective view showing the engaged state of the shift lever and the control lever.

FIG. 7 is a perspective view of the control lever 4. FIG. 8 is a plan view showing an engaged state of the lever engaging member 22 of the shift lever 2 and the control lever 4. FIG. 9 is a perspective view showing the engaged state of the lever engaging member 22 of the shift lever 2 and the control lever 4.

As shown in these drawings, the control lever 4 has a lever main body 41, the engaging projection 42, turning shaft parts 43, the cable coupling part 44, and a branched part 45.

The lever main body 41 is a main body of the control lever 4, and has, as seen in a state where the control lever 4 is installed on the baseplate 3, a first extension part 41a extending along the vehicle body front-rear direction, a second extension part 41b extending from a front end edge of the first extension part 41a toward a left side in the vehicle width direction (one side in the vehicle width direction) (a vehicle-width-direction extension part extending toward one side in the vehicle width direction), and a third extension part 41c extending from an end edge (on the left side in the vehicle width direction) of the second extension part 41b toward the vehicle body front side (a front-rear-direction extension part continuous with the vehicle-width-direction extension part and extending along the vehicle body front-rear direction).

The engaging projection 42 is continuous with a rear-side edge of the first extension part 41a of the lever main body 41 and protrudes toward the left side in the vehicle width direction. The shape of the engaging projection 42 as seen in a side view (as seen from the vehicle width direction) substantially matches the shape of the engaging opening 22b of the lever engaging member 22. As shown in FIG. 8 and FIG. 9, the engaging projection 42 of the control lever 4 is inserted into the engaging opening 22b of the lever engaging member 22 (from a right side in the vehicle width direction), and thereby the control lever 4 and the shift lever 2 are engaged with each other, so that an operating force input into the shift lever 2 is transmitted to the control lever 4.

Figure 10:
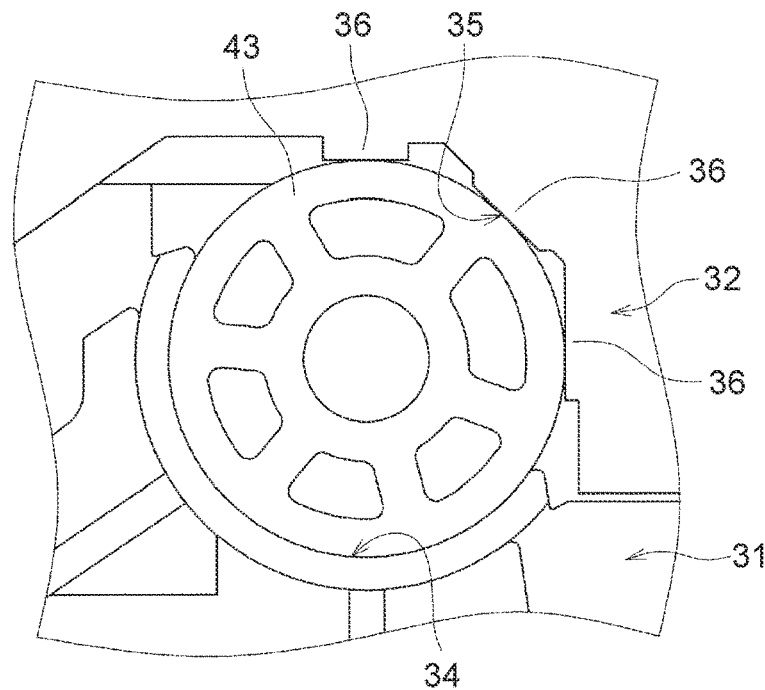
FIG. 10 is a side view showing a turning shaft part of the control lever and a surrounding area.

The turning shaft parts 43 are parts that are provided at a lower end of the control lever 4 and turnably supported by the baseplate 3. FIG. 10 is a side view showing the turning shaft part 43 of the control lever 4 and a surrounding area. As shown in FIG. 10, an outer circumferential edge of each turning shaft part 43 has a perfectly circular shape as seen from the vehicle width direction. Thus, the turning shaft parts 43 have a substantially columnar shape with a predetermined thickness along the vehicle width direction.

Lower support parts 34 that each support a lower half of the corresponding turning shaft part 43 of the control lever 4 is provided in the lower baseplate 31, on both outer sides of the lever holding member fitting part 31b (both outer sides thereof in the vehicle width direction). Similarly, upper support parts 35 that each support an upper half of the corresponding turning shaft part 43 of the control lever 4 are provided in the upper baseplate 32, on both outer sides of the lever holding member fitting part 31b (both outer sides thereof in the vehicle width direction in a state where the upper baseplate 32 is installed on the lower baseplate 31).

The lower support part 34 has a circular arc shape matching the shape of the outer circumferential edge of the turning shaft part 43 as seen from the vehicle width direction. Therefore, in a state where the turning shaft part 43 is placed on the lower support part 34, the outer circumferential edge (outer circumferential surface) of a lower-side part of the turning shaft part 43 is in contact with an inner surface of the lower support part 34 of the lower baseplate 31.

On the other hand, a plurality of protrusions 36 protruding toward the center of turning of the turning shaft part 43 is provided on an inner surface of the upper support part 35. Leading ends of the protrusions 36 are partially in contact with the outer circumferential edge (outer circumferential surface) of an upper-side part of the turning shaft part 43, which prevents rattling of the turning shaft part 43 in a state where the turning shaft part 43 is turnably supported by the baseplate 3.

This configuration can secure a large area of contact between the turning shaft parts 43 and the lower support parts 34, and thereby reduce the contact pressure on each of the outer circumferential surfaces of the turning shaft parts 43 and inner circumferential surfaces of the lower support parts 34 (a load acting thereon per unit area), and mitigate wear on these outer circumferential surfaces of the turning shaft parts 43 and these inner circumferential surfaces of the lower support parts 34. Wear on the outer circumferential surfaces of the turning shaft parts 43 and the inner circumferential surfaces of the lower support parts 34 can be mitigated because, for example, a reaction force from the cable 8 that occurs when shifting operation of the shift lever 2 is performed can be borne by these surfaces.

As shown in FIG. 10, in this embodiment, leading end surfaces of the protrusions 36 protruding from the inner surface of the upper support part 35 are flat surfaces. However, the leading end surfaces are not limited to this example, and may be formed as circular arc-shaped surfaces matching the shape of the outer circumferential edge of the turning shaft part 43.

The cable coupling part 44 protrudes from a surface of the third extension part 41c on the right side in the vehicle width direction (the other side in the vehicle width direction) toward the right side in the vehicle width direction. The cable coupling part 44 has a substantially columnar shape, and a groove 44a to which one end portion of the cable 8 is coupled is formed near a leading end portion in an axial direction, along the entire circumference.

Thus, the turning shaft parts 43 and the cable coupling part 44 are provided in the control lever 4 such that the cable coupling part 44 is located at an upper part while the pair of turning shaft parts 43 is located at a lower part and turnably supported by the baseplate 3 on both outer sides of the spherical shaft member 23 in the vehicle width direction.

One of the features of this embodiment is that the control lever 4 is provided with the branched part 45. The branched part 45 is continuous with a lower end edge of the lever main body 41 and branched in the vehicle width direction so as to extend toward the turning shaft parts 43. In other words, the branched part 45 is branched in the vehicle width direction between the cable coupling part 44 and the turning shaft parts 43, above the spherical shaft member 23, so as to extend toward the turning shaft parts 43. Thus, the branched part 45 has a right branch 45R that is continuous with a lower end edge of the lever main body 41 and shifts toward the right side in the vehicle width direction so as to be continuous with an upper surface of the turning shaft part 43 located on the right side in the vehicle width direction, and a left branch 45L that is continuous with the lower end edge of the lever main body 41 and shifts toward the left side in the vehicle width direction so as to be continuous with an upper surface of the turning shaft part 43 located on the left side in the vehicle width direction.

Specifically, the right branch 45R has a portion that inclines downward from the lower end edge of the lever main body 41 toward the right side in the vehicle width direction, and a portion that extends downward from that portion toward the upper surface of the turning shaft part 43 located on the right side. Similarly, the left branch 45L has a portion that inclines downward from the lower end edge of the lever main body 41 toward the left side in the vehicle width direction, and a portion that extends downward from that portion toward the upper surface of the turning shaft part 43 located on the left side.

Such a branched part 45 is provided, and the turning shaft parts 43 are integrally provided at lower ends of the branched part 45 (the branches 45R, 45L). Thus, the spherical shaft member 23 of the shift lever 2 and the turning shaft parts 43 of the control lever 4 are separately supported by the baseplate 3. Specifically, the spherical shaft member 23 of the shift lever 2 is turnably supported by the lever holding member 33 that is fitted in the lever holding member fitting part 31b provided at the central part of the lower baseplate 31 in the vehicle width direction, while the turning shaft parts 43 of the control lever 4 are turnably supported between the lower support parts 34 of the lower baseplate 31 and the upper support parts 35 of the upper baseplate 32, on both outer sides of the baseplate 3 (both outer sides of the lever holding member 33) in the vehicle width direction.

As shown in FIG. 7 and FIG. 9, the lever main body 41, the turning shaft parts 43, and the branched part 45 of the control lever 4 are provided with a plurality of recesses 46 to reduce the weight of the control lever 4. The formation positions and the size of the recesses 46 are designed such that the weight of the control lever 4 can be sufficiently reduced while the rigidity of each part thereof is sufficiently secured.

Specific support positions of the turning shaft parts 43 are such that a centerline connecting the centers of turning of the turning shaft parts 43 (a centerline extending along the vehicle width direction; the long dashed-short dashed line L1 in FIG. 8) passes through the center of the spherical shaft member 23 that is turnably supported by the lever holding member 33. A central portion of the cable coupling part 44 of the control lever 4 in an axial direction is located near an imaginary plane (the long dashed-short dashed line L2 in FIG. 8) that passes through the center of the spherical shaft member 23 and extends along the vehicle body front-rear direction. Alternatively, this central portion of the cable coupling part 44 in a longitudinal direction may be located in the imaginary plane L2 passing through the center of the spherical shaft member 23 and extending along the vehicle body front-rear direction. The position at which the engaging projection 42 of the control lever 4 is engaged in the engaging opening 22b of the lever engaging member 22 (the position at which an outer surface of the engaging projection 42 is in contact with an inner surface of the engaging opening 22b) is also located in or near the imaginary plane L2.

Figure 11:
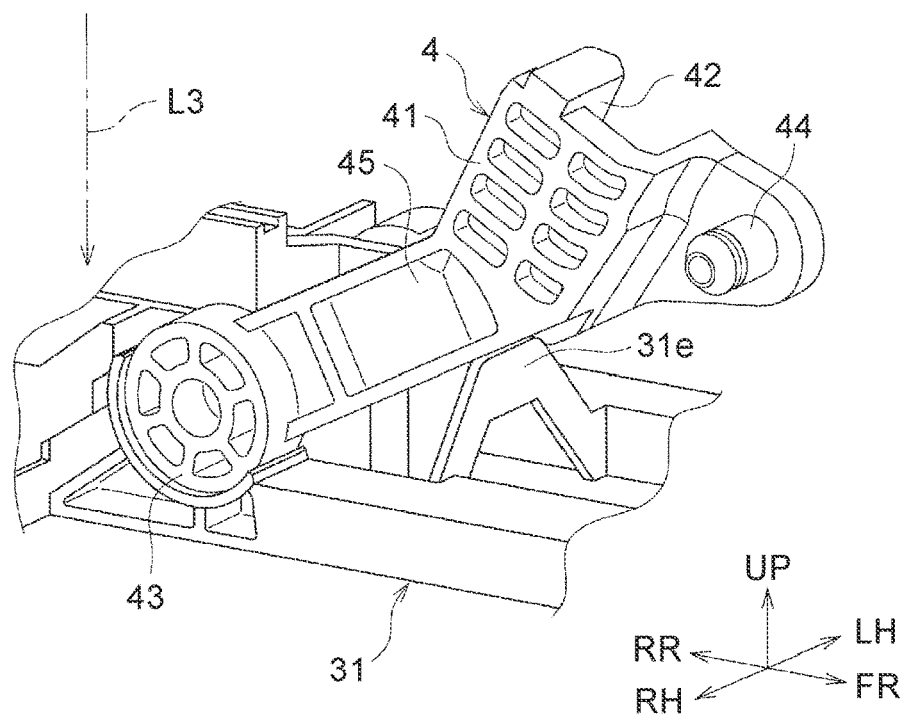
FIG. 11 is a perspective view showing a temporarily held state of the control lever.

As shown in FIG. 11 (a perspective view showing a temporarily held state of the control lever 4), the lower baseplate 31 is provided with a temporary holding part 31e on which, before the spherical shaft member 23 of the shift lever 2 is installed, the control lever 4 that has been turned toward the front side in the vehicle body front-rear direction so as to be away from an installation path of installing the spherical shaft member 23 (see the arrow of the long dashed-short dashed line L3 in FIG. 11) is placed and temporarily held.

The temporary holding part 31e is formed by a plate part of which outer edges have a substantially trapezoidal shape as seen in a front view, and the control lever 4 in the turned position is placed on an upper edge thereof (an upper edge extending in a horizontal direction). More specifically, a border portion between the lever main body 41 and the branched part 45 of the control lever 4 is placed on the upper edge of the temporary holding part 31e. Thus, to install the spherical shaft member 23 of the shift lever 2 onto the lever holding member 33, the control lever 4 is turned toward the front side in the vehicle body front-rear direction so as to be away from the installation path of the spherical shaft member 23, and the control lever 4 is placed on and temporarily held by the temporary holding part 31e of the lower baseplate 31. Thus, the work of installing the spherical shaft member 23 can be efficiently performed, without the control lever 4 getting in the way during the work of installing the spherical shaft member 23.

The turned posture of the control lever 4 in a state where the control lever 4 is placed on the upper edge of the temporary holding part 31e is a posture of being further turned toward the front side (inclined downward) than a turned posture of the control lever 4 in a state where the shift lever 2 is operated to the P-range position.

Shift Gate Cushion

Figure 12:
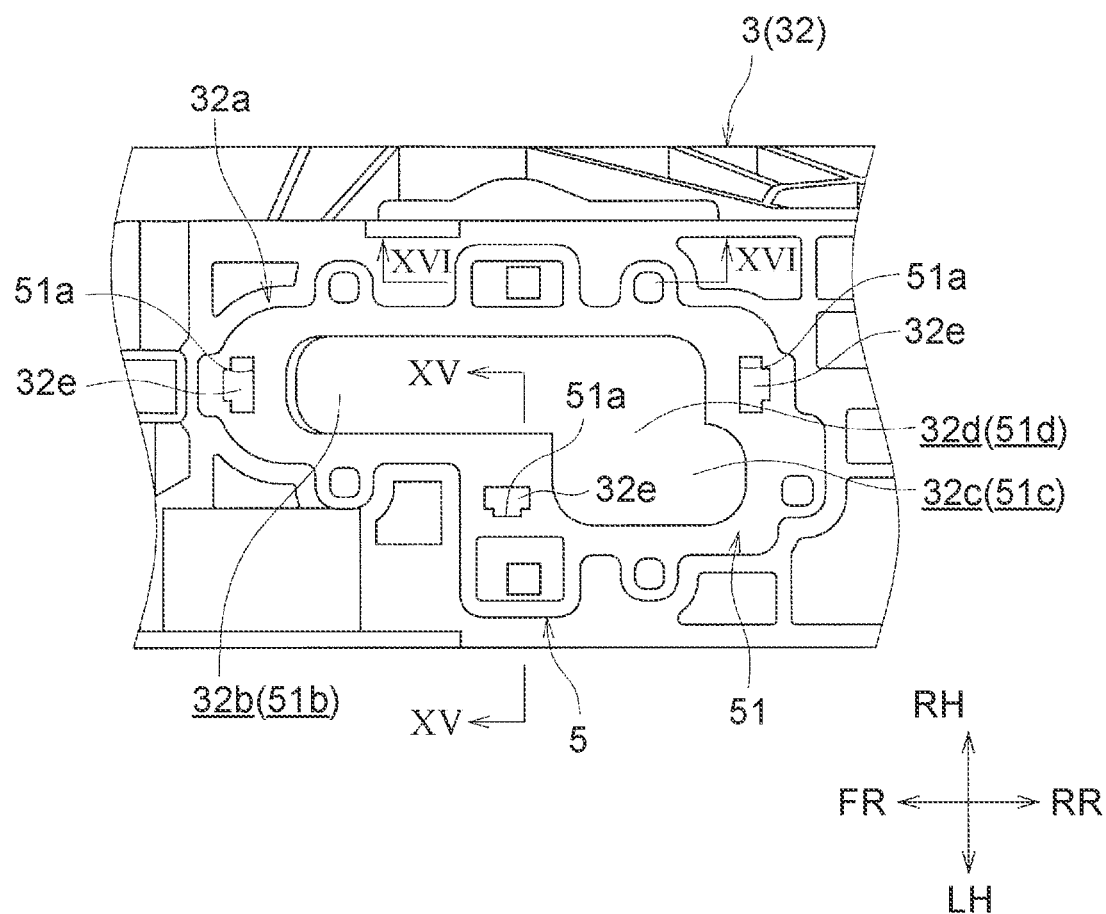
FIG. 12 is a plan view showing a gate of the shift device.
Figure 13:
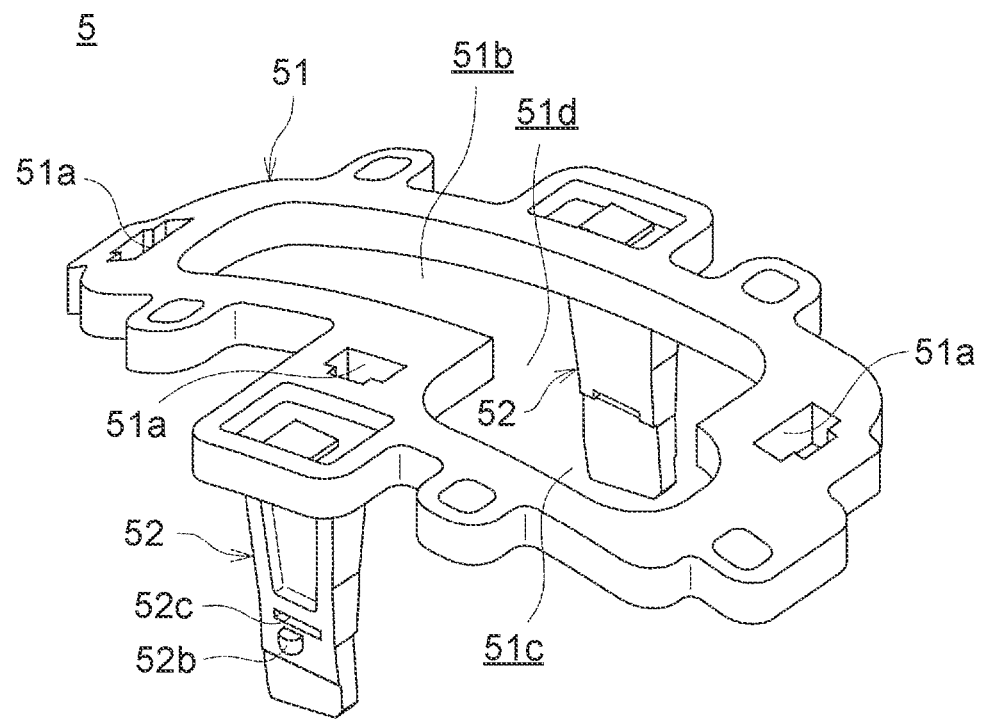
FIG. 13 is a perspective view of a shift gate cushion.

FIG. 12 is a plan view showing the gate 32a of the shift device 1. FIG. 13 is a perspective view of the shift gate cushion (cushion member) 5.

The shift gate cushion 5 is produced as a part separate from the baseplate 3 and made of a material softer than a material composing the baseplate 3. For example, the baseplate 3 is composed of a nylon resin reinforced with glass fibers, while the shift gate cushion 5 is composed of a thermoplastic polyester elastomer, such as Hytrel (R). The materials are not limited to these examples but appropriately selected.

The shift gate cushion 5 has a shift gate cushion part 51 and detent cushions 52.

The shift gate cushion part 51 is a part that covers edges of the gate openings 32b, 32c, 32d of the gate 32a of the upper baseplate 32. The shift gate cushion part 51 is formed in a frame shape extending along the edges of the gate openings 32b, 32c, 32d of the gate 32a of the upper baseplate 32. Gate openings 51b, 51c, 51d corresponding to the gate openings 32b, 32c, 32d, respectively, of the gate 32a are provided at a central part of the shift gate cushion part 51. Shifting operation of the shift lever 2 is performed such that the lever main body 21 moves along the gate openings 51b, 51c, 51d.

Engaging holes 51a bored in the up-down direction are formed at a plurality of positions in the shift gate cushion part 51. A plurality of engaging projections 32e that is inserted and engaged into the engaging holes 51a is provided on an upper surface of the upper baseplate 32. As the engaging projections 32e of the upper baseplate 32 are inserted and engaged into the engaging holes 51a of the shift gate cushion part 51, the shift gate cushion 5 is mounted on the upper surface of the upper baseplate 32. In this mounted state, an outer edge of the shift gate cushion part 51 lies on the edges of the gate openings 32b, 32c, 32d of the gate 32a of the upper baseplate 32, and the shift gate cushion 5 is mounted on the upper baseplate 32 without a clearance between these edges.

Since the shift gate cushion 5 is made of a soft material as described above, when shifting operation of the shift lever 2 is performed and the shift lever 2 is operated to the P-range position or the D-range position, the impact of the shift lever 2 coming into contact with the shift gate cushion 5 is absorbed as the shift gate cushion part 51 deforms elastically.

Figure 14:
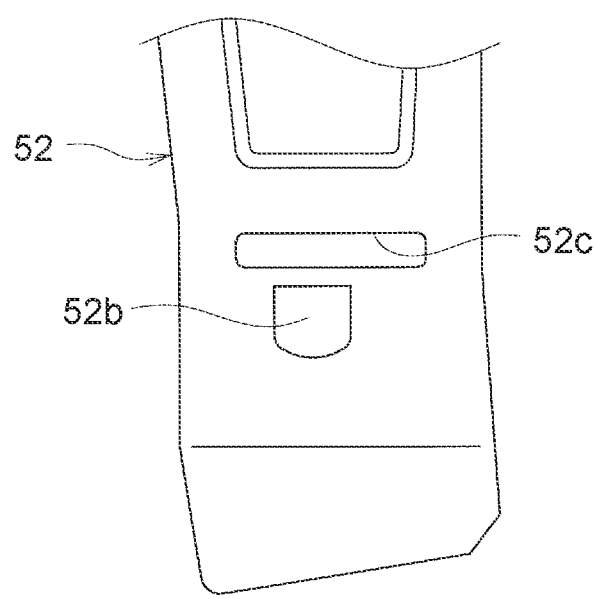
FIG. 14 is a side view showing a detent cushion of the shift gate cushion.
Figure 15:
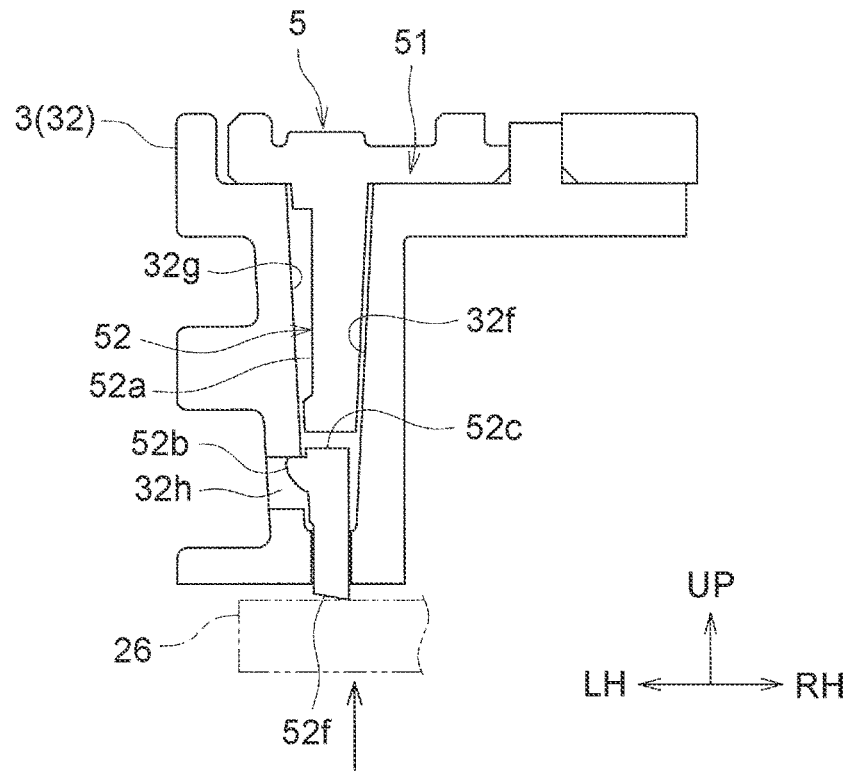
FIG. 15 is a sectional view taken along line XV-XV in FIG. 12.
Figure 16:
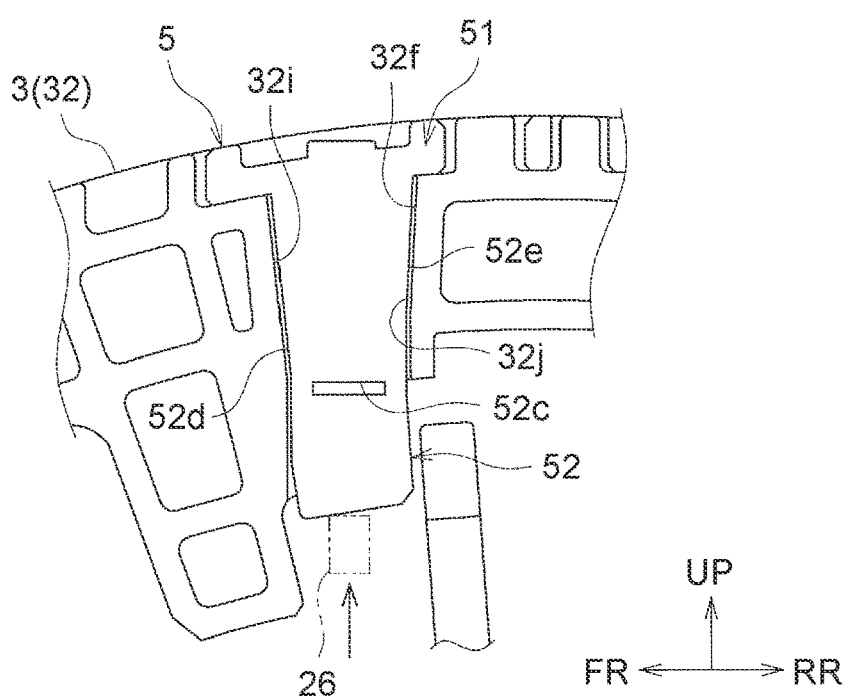
FIG. 16 is a sectional view taken along line XVI-XVI in FIG. 12.

The detent cushions 52 extend downward from both sides (in the vehicle width direction) of a central position in the vehicle body front-rear direction of the shift gate cushion part 51. The positions of lower ends of the detent cushions 52 are set at such positions that the detent cushions 52 come into contact with the detent pin 26 in a state where the detent pin 26 has reached a raised position. As shown in FIG. 14 (a side view showing the detent cushion 52), the detent cushion 52 is formed by a plate part having a substantially rectangular shape as seen in a side view. The upper baseplate 32 is provided with insertion holes 32f into which the detent cushions 52 are inserted. FIG. 15 is a sectional view taken along line XV-XV in FIG. 12. FIG. 16 is a sectional view taken along line XVI-XVI in FIG. 12. As shown in FIG. 15, an opening 32h bored along the vehicle width direction is formed in a vertical wall 32g on an outer side in the vehicle width direction that is one of vertical walls forming an inner surface of the insertion hole 32f. An engaging projection 52b that engages with an upper edge of the opening 32h in a state where the detent cushion 52 is inserted in the insertion hole 32f is formed in a side surface 52a of the detent cushion 52 (a side surface facing the outer side in the vehicle width direction). Thus, the detent cushion 52 is inserted into the insertion hole 32f, and at a point when the amount of insertion reaches a predetermined amount (a point when the shift gate cushion part 51 comes into contact with the upper surface of the upper baseplate 32), the engaging projection 52*b* is engaged with the upper edge of the opening 32*h* and thereby the detent cushion 52 is prevented from slipping out.

The insertion hole 32*f* opens at a lower side. In a state where the engaging projection 52*b* of the detent cushion 52 is engaged with the upper edge of the opening 32*h* and the detent cushion 52 is prevented from slipping out as described above, the lower end of the detent cushion 52 protrudes downward slightly beyond a lower end of the vertical wall 32*g* (protrudes slightly from an opening at the lower end). A lower end surface 52*f* of the detent cushion 52 is formed as an inclined surface inclining downward while extending toward a center side in the vehicle width direction.

An opening 52*c* bored along the vehicle width direction is formed in the detent cushion 52, above the engaging projection 52*b*. The opening 52*c* is formed in a slit shape of which the dimension in the vehicle body front-rear direction is longer than the dimension in the up-down direction.

As shown in FIG. 16, a clearance is left between a vertical wall 32*i* on the front side in the vehicle body front-rear direction that is one of the vertical walls forming the inner surface of the insertion hole 32*f* and a front end surface 52*d* of the detent cushion 52, and between a vertical wall 32*j* on the rear side in the vehicle body front-rear direction that is one of the vertical walls and a rear end surface 52*e* of the detent cushion 52.

As described above, the detent cushion 52 extends downward so as to come into contact with the detent pin 26 in the state where the detent pin 26 has reached the raised position. Since the shift gate cushion 5 is composed of a soft material, the impact of the detent pin 26 coming into contact with the detent cushion 52 of the shift gate cushion 5 (see the detent pin 26 indicated by the imaginary lines in FIG. 15 and FIG. 16) is absorbed as the detent cushion 52 deforms elastically. As described above, the lower end surface 52*f* of the detent cushion 52 is formed as an inclined surface inclining downward while extending toward the center side in the vehicle width direction, which facilitates elastic deformation of a lower end portion of the detent cushion 52. Further, the opening 52*c* is formed above the engaging projection 52*b* in the detent cushion 52, and thus a portion of the detent cushion 52 around the opening 52*c* is fragile. Therefore, this portion can undergo a large amount of elastic deformation, which also contributes to effectively absorbing the impact. In addition, a clearance is left between the vertical walls 32*i*, 32*j* forming part of the inner surface of the insertion hole 32*f* and the end surfaces 52*d*, 52*e* of the detent cushion 52. Thus, a space in which the detent cushion 52 can deform elastically when the detent pin 26 comes into contact with the detent cushion 52 is secured. Specifically, when the detent pin 26 having reached the raised position comes into contact with the detent cushion 52 of the shift gate cushion 5, an upward load acts on the detent cushion 52, and this load is absorbed as the detent cushion 52 deforms elastically so as to fill the clearance.

For these reasons, the impact noise of the detent pin 26 coming into contact with the detent cushion 52 of the shift gate cushion 5 can be reduced, and the load input into the detent pin 26 on contact can also be reduced. As a result, it is possible to keep the detent mechanism quiet during operation and enhance the durability of the detent mechanism.

The shift gate cushion 5 is produced as a part separate from the baseplate 3 and installed along the edges of the gate openings 32*b*, 32*c*, 32*d* of the gate 32*a* of the baseplate 3. This production method can reduce the manufacturing cost compared with a common method in which a cushion member and a baseplate are integrally produced (a cushion member made of a different material from a baseplate is integrally molded inside the baseplate).

Shift Lock Unit

The shift lock unit 6 is a mechanism that prohibits movement of the shift lever 2 (e.g., from the P-range position) by restricting downward movement of the detent pin 26 even when the shift knob switch is pressed down. Typically, the shift lock unit 6 prohibits movement of the shift lever 2 by restricting downward movement of the detent pin 26 when the driver is not pressing a brake pedal of the vehicle in a state where the shift lever 2 is in the P-range position. On the other hand, when the driver is pressing the brake pedal of the vehicle, the shift lock unit 6 allows movement of the shift lever 2 by allowing downward movement of the detent pin 26.

Figure 17:
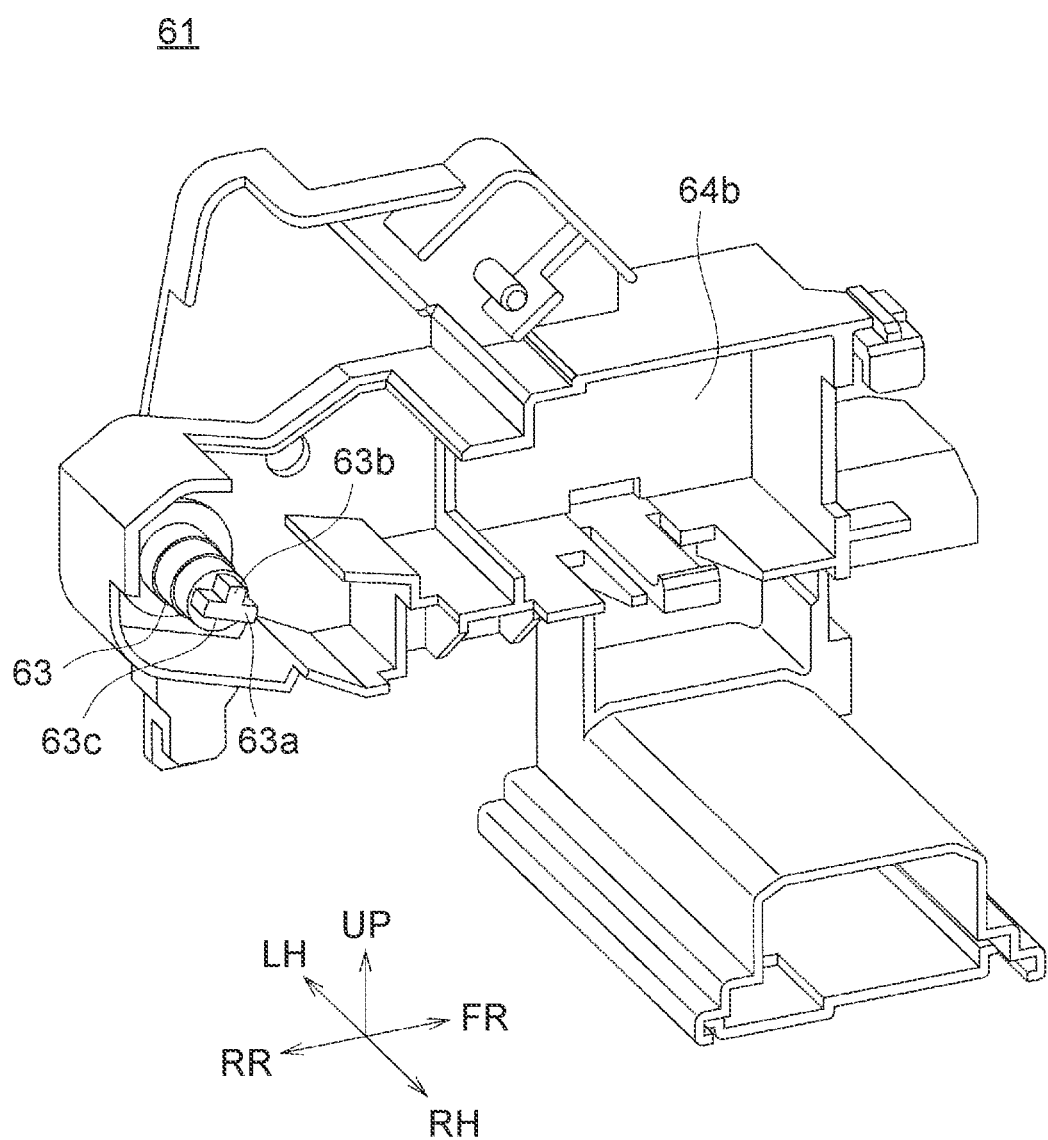
FIG. 17 is a perspective view of a shift lock case.
Figure 18:
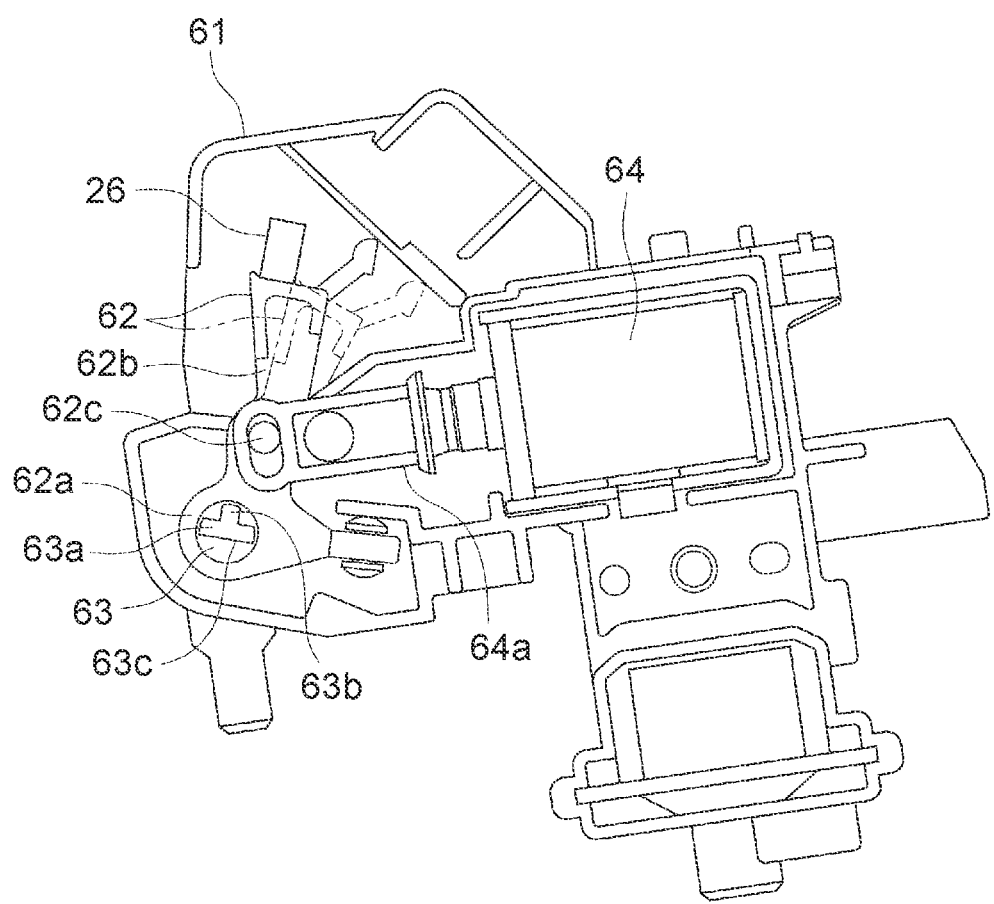
FIG. 18 is a side view showing the shift lock case and a shift lock link.

FIG. 17 is a perspective view of a shift lock case 61 of the shift lock unit 6. FIG. 18 is a side view showing the shift lock case 61 and a shift lock link 62. As shown in these drawings, a boss 63 that turnably supports the shift lock link 62 that restricts downward movement of the detent pin 26 is provided on an inner surface of the shift lock case 61 so as to extend in a horizontal direction.

The shift lock link 62 has a cylindrical part 62*a* that is turnably supported by the boss 63 and a turning arm 62*b* that extends upward from the cylindrical part 62*a*. An engaging pin 62*c* protruding in the horizontal direction is provided at an intermediate portion of the turning arm 62*b* in an extension direction thereof.

An actuator housing part 64*b* is provided in the shift lock case 61, on the front side of a position at which the shift lock link 62 is provided, and an actuator 64 that regulates a turning position of the shift lock link 62 is housed inside the actuator housing part 64*b*. The actuator 64 has a built-in electromagnetic solenoid and a rod 64*a* that can move toward and away from the shift lock link 62. The rod 64*a* is connected to the engaging pin 62*c* of the shift lock link 62. The actuator 64 is configured such that the rod 64*a* is retracted as a current is applied to the electromagnetic solenoid.

The shift lock link 62 is subjected to an urging force in a counterclockwise direction in FIG. 18 by a spring (not shown), and this urging force keeps the shift lock link 62 at a position facing the detent pin 26.

Therefore, in a state where the rod 64*a* of the actuator 64 protrudes as indicated by the solid lines in FIG. 18 (a state where a current is not applied to the electromagnetic solenoid), the shift lock link 62 has been turned to a restricting position (a position farther in the counterclockwise direction in FIG. 18), at which an upper surface of the shift lock link 62 comes into contact with the lower end of the detent pin 26 and downward movement of the detent pin 26 is thereby restricted. On the other hand, when the rod 64*a* of the actuator 64 is retracted (a state where a current is applied to the electromagnetic solenoid), as indicated by the imaginary lines in FIG. 18, the shift lock link 62 has been turned against the urging force of the spring to a non-restricting position (a position farther in a clockwise direction in FIG. 18), at which the shift lock link 62 allows downward movement of the detent pin 26. In other words, the shift lock link 62 allows the detent pin 26 to move out of a groove (e.g., the P-groove) of the detent plate of the detent mechanism.

Figure 19:
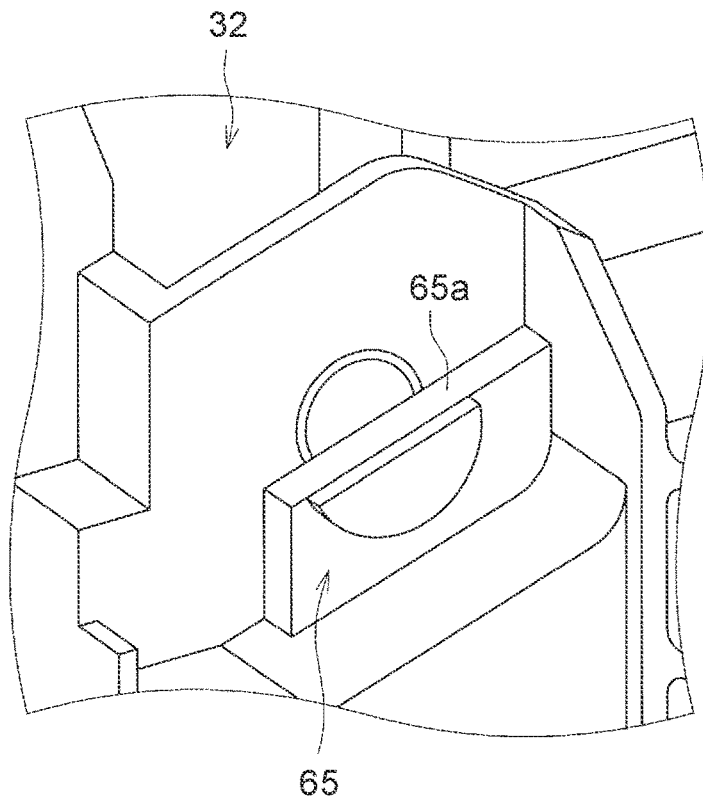
FIG. 19 is a perspective view showing a part of an upper baseplate on which the shift lock case is installed.

FIG. 19 is a perspective view showing a part of the upper baseplate 32 on which the shift lock case 61 is installed. As shown in FIG. 19, the upper baseplate 32 is provided with a boss receiving part 65 that supports the boss 63 of the shift lock case 61. The boss receiving part 65 is formed by a protrusion protruding toward the side on which the shift lock case 61 is installed (the left side in the vehicle width direction).

Figure 20:
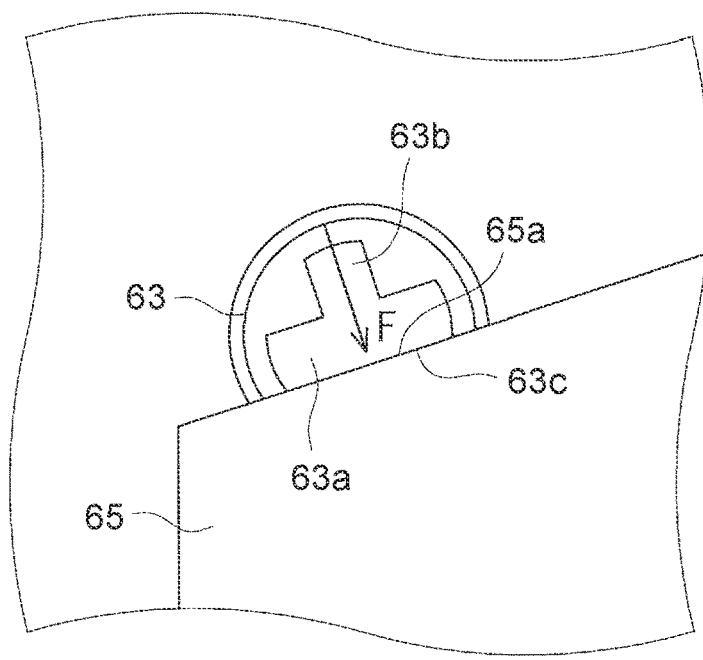
FIG. 20 is a view illustrating a load that is input from a detent pin into a boss of the shift lock case through the shift lock link in a shift lock state.

The shift lock case 61 features the sectional shape of the boss 63 (as seen from the vehicle width direction). As shown in FIG. 17 and FIG. 20 (a view illustrating a load that is input from the detent pin 26 into the boss 63 of the shift lock case 61 through the shift lock link 62 in a shift lock state), the sectional shape of the boss 63 is a substantially T-shape having a horizontal part 63a that extends in a substantially horizontal direction along the vehicle body front-rear direction (in reality, the horizontal part 63a is slightly inclined relative to the horizontal direction) and a vertical part 63b that extends upward from a central portion (in the vehicle body front-rear direction) of the horizontal part 63a. A lower surface 63c of the horizontal part 63a is laid on the boss receiving part 65 of the upper baseplate 32, and the lower surface 63c of the horizontal part 63a is formed as a flat surface.

The boss 63 is placed on an upper surface 65a of the boss receiving part 65 provided in the upper baseplate 32. The upper surface 65a of the boss receiving part 65 is formed as a flat surface which is positioned along the lower surface 63c of the horizontal part 63a of the boss 63 and on which the boss 63 is placed such that the entire lower surface 63c is in contact.

In the shift lock state where movement of the shift lever 2 is restricted by the shift lock unit 6 (the state indicated by the solid lines in FIG. 18), the shift lock link 62 turnably supported by the boss 63 provided in the shift lock case 61 comes into contact with a lower end of the detent pin 26 and thereby restricts downward movement of the detent pin 26. In this case, as the shift knob switch is pressed down, the detent pin 26 presses the shift lock link 62 downward, and the pressing force is input into the boss 63 of the shift lock case 61 through the shift lock link 62 as indicated by the arrow F in FIG. 20. As described above, in this embodiment, the lower surface 63c of the boss 63 that comes into contact with the boss receiving part 65 is a flat surface, and the boss receiving part 65 is formed by the protrusion having the upper surface 65a that is a flat surface on which the lower surface (flat surface) 63c of the boss 63 is laid. Thus, the pressing force F is borne by a part at which the respective flat surfaces (the lower surface 63c and the upper surface 65a) of the boss 63 and the boss receiving part 65 are laid one on top of the other, and therefore a sufficient capacity for bearing the pressing force F is secured. Since the contact surfaces of the boss 63 and the boss receiving part 65 are the flat surfaces, good dimensional accuracy can be achieved compared with a related art in which contact surfaces of a boss 63 and a boss receiving part 65 are circular arc-shaped surfaces. Moreover, since the boss receiving part 65 is formed by the protrusion, deformation during molding (e.g., resin injection molding) can be mitigated, which also contributes to high dimensional accuracy.

Modified Example of Boss and Boss Receiving Part

Figure 21:
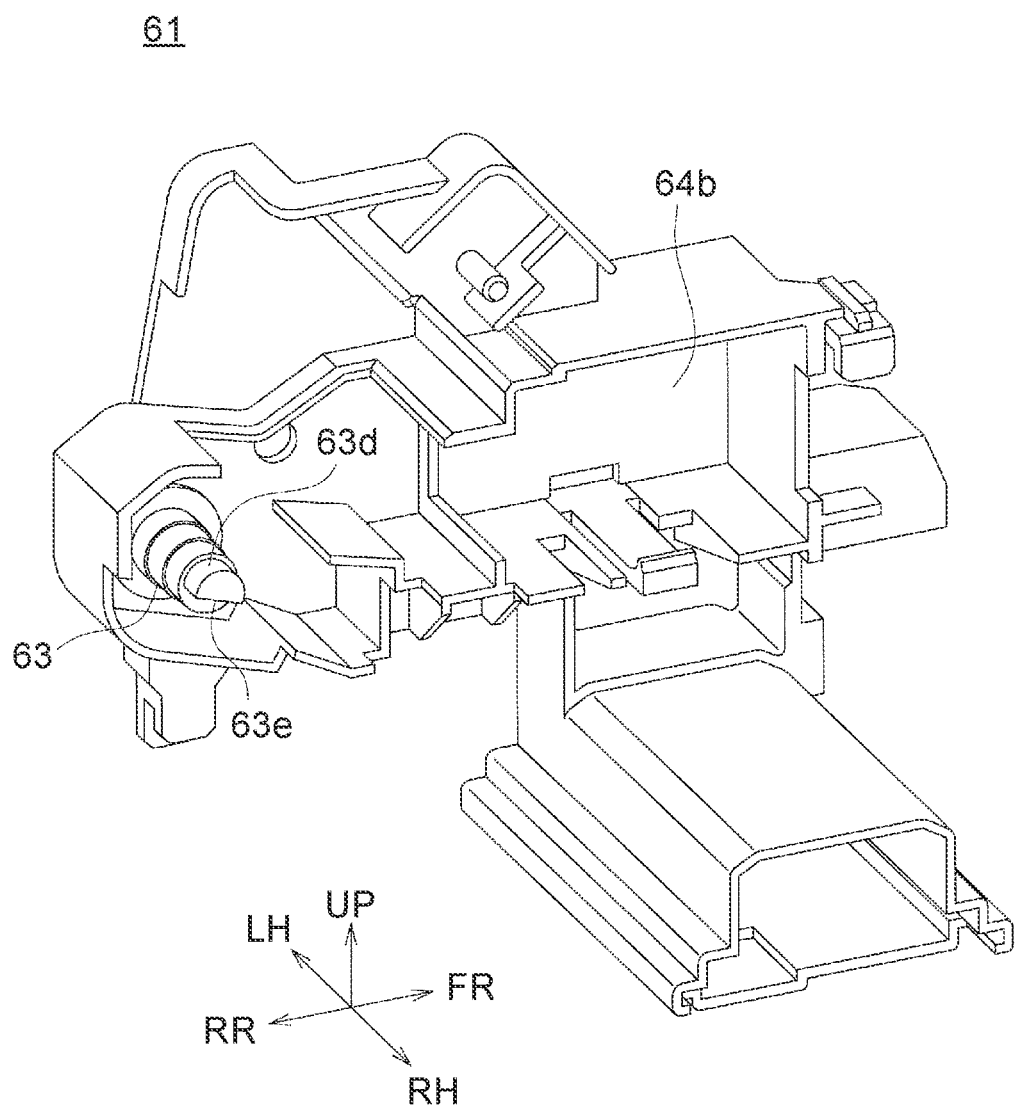
FIG. 21 is a view of a modified example corresponding to FIG. 17.
Figure 22:
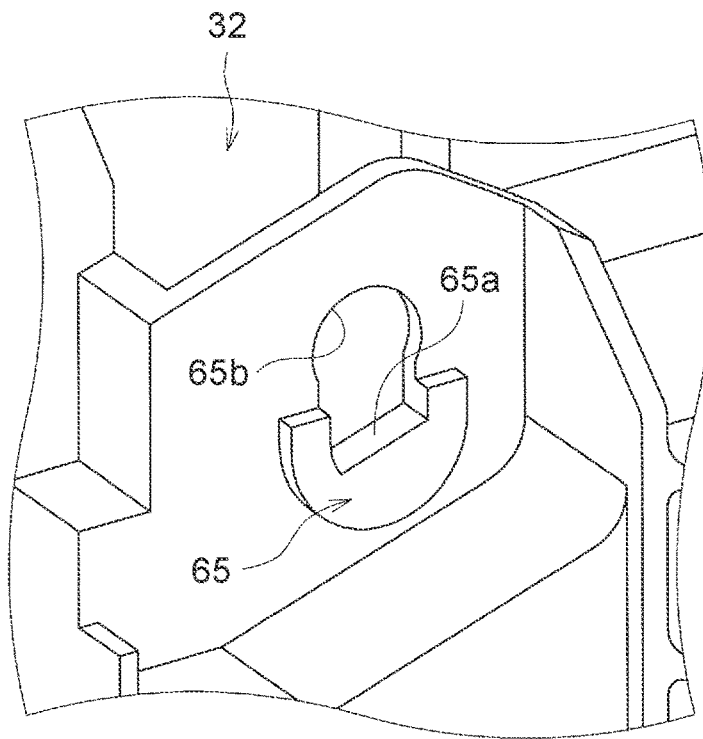
FIG. 22 is a view of the modified example corresponding to FIG. 19.
Figure 23:
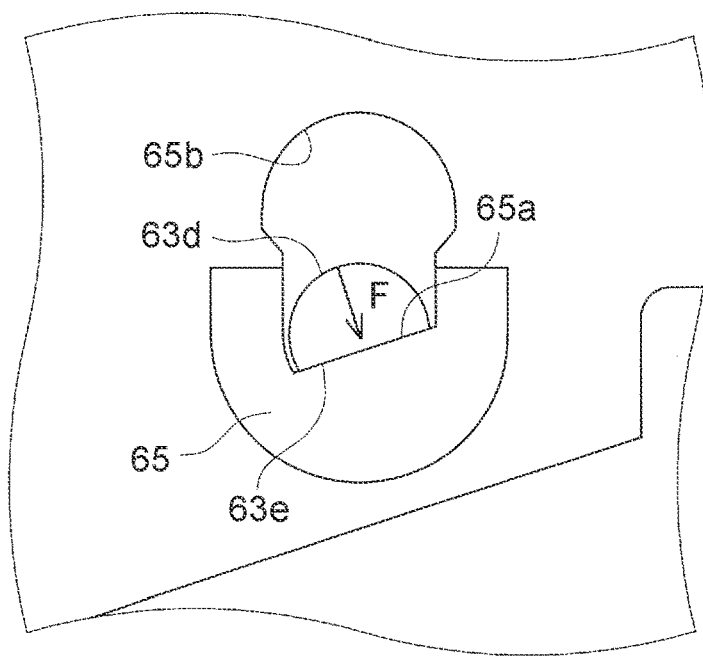
FIG. 23 is a view of the modified example corresponding to FIG. 20.

Next, a modified example of the boss 63 and the boss receiving part 65 will be described. FIG. 21 is a view of the modified example corresponding to FIG. 17. FIG. 22 is a view of the modified example corresponding to FIG. 19. FIG. 23 is a view of the modified example corresponding to FIG. 20.

As shown in these drawings, the boss 63 has a semicircular cross-sectional shape. Specifically, an upper side of the boss 63 is formed by a semicircular arc-shaped curved surface 63d while a lower side thereof is formed by a flat surface 63e.

On the other hand, the upper surface 65a of the boss receiving part 65 provided in the upper baseplate 32 is formed, as in the embodiment, by a flat surface which is positioned along the flat surface 63e on the lower side of the boss 63 and on which the boss 63 is placed such that the entire flat surface 63e is in contact. In the upper baseplate 32 of this modified example, an opening 65b through which a leading end portion of the boss 63 is passed is provided above the flat upper surface 65a that is a flat surface.

This configuration has advantages similar to those of the above embodiment. Namely, a sufficient capacity for bearing the pressing force F is secured and good dimensional accuracy can be achieved.

Manual-Mode Selection Switch

The manual-mode selection switch 7 is a switch that is pressed by the shift lever 2 to switch the automatic transmission to the manual mode. Specifically, in the automatic mode of the automatic transmission, the shift lever 2 is located in the automatic-mode gate opening 32b of the upper baseplate 32. When the driver desires the manual mode, the driver moves the shift lever 2 from the automatic-mode gate opening 32b of the upper baseplate 32 to the manual-mode gate opening 32c through the gate communication opening 32d (see the imaginary lines in FIG. 8). As a result of this movement, the control lever 4 and the shift lever 2 are disengaged from each other (the engaging projection 42 of the control lever 4 is removed from the engaging opening 22b of the lever engaging member 22), and the shift lever 2 presses an operating part (not shown) of the manual-mode selection switch 7, so that the automatic transmission is switched to the manual mode. Each time the shift lever 2 is operated toward the plus operation position of the manual-mode gate opening 32c, the gear stage is upshifted, and each time the shift lever 2 is operated toward the minus operation position, the gear stage is downshifted.

The control lever 4 is fixed in position while the shift lever 2 is operated in the manual mode. When the driver desires the automatic mode and returns the shift lever 2 from the manual-mode gate opening 32c to the automatic-mode gate opening 32b, the engaging projection 42 of the control lever 4 is inserted into the engaging opening 22b of the lever engaging member 22 again and the control lever 4 and the shift lever 2 are engaged with each other.

Structure for Combining Upper Baseplate and Lower Baseplate

Next, a structure for combining the upper baseplate 32 and the lower baseplate 31 will be described. In this embodiment, the lower baseplate 31 and the upper baseplate 32 are integrally combined by one engaging pin 9.

Figure 24:
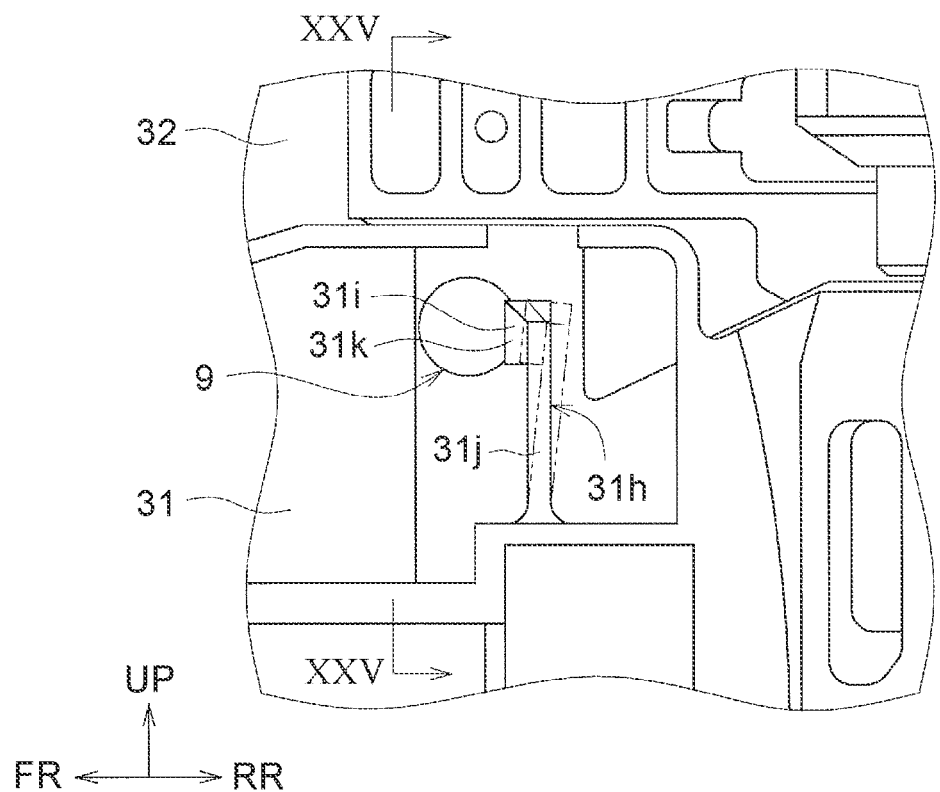
FIG. 24 is a view showing a part at which the upper baseplate and a lower baseplate are engaged with each other by an engaging pin.
Figure 25:
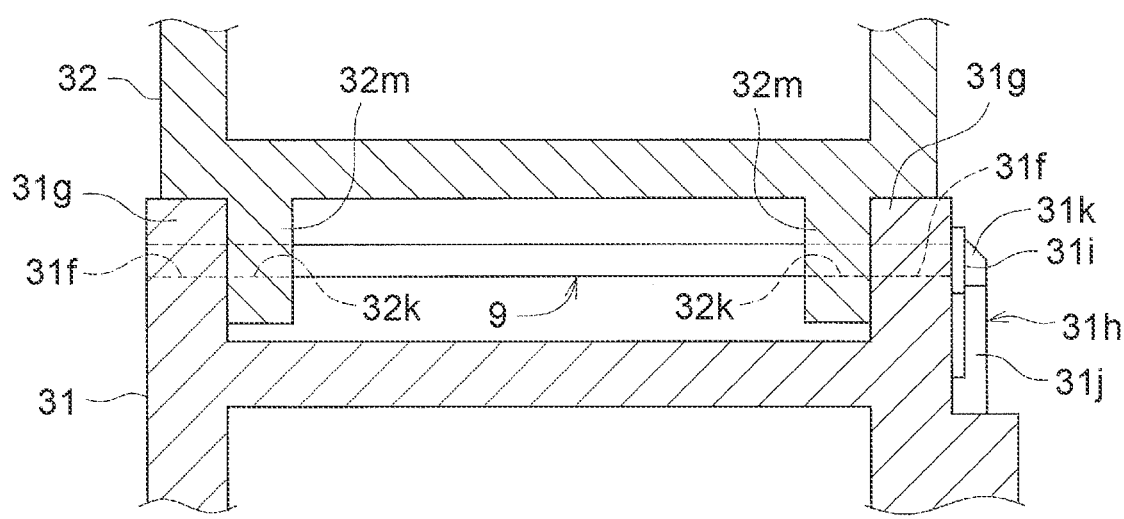
FIG. 25 is a sectional view taken along line XXV-XXV in FIG. 24.

FIG. 24 is a view showing a part at which the upper baseplate 32 and the lower baseplate 31 are engaged with each other by the engaging pin 9. FIG. 25 is a sectional view taken along line XXV-XXV in FIG. 24. As shown in these drawings, the upper baseplate 32 and the lower baseplate 31 are provided respectively with mating walls 31g, 32m in which pin holes 31f, 32k are formed, and the upper baseplate 32 and the lower baseplate 31 are integrally combined as the mating walls 31g, 32m are overlapped with each other and the engaging pin 9 is passed through the pin holes 31f, 32k.

Of the mating walls 32m of the upper baseplate 32 and the mating walls 31g of the lower baseplate 31, the mating wall 31g located on one side (in this embodiment, the left side in the vehicle width direction) of the lower baseplate 31 that is located on an outer side in a pin passing direction is integrally provided with a pin slip-out preventing piece 31h that extends in a direction along an extension direction of the mating wall 31g.

The pin slip-out preventing piece 31h is configured to bend in a direction orthogonal to an insertion direction of the engaging pin 9 (horizontal direction), between a position away from the engaging pin 9 (see the imaginary lines in FIG. 24) and a position covering an end surface of the engaging pin 9 (see the solid lines in FIG. 24), and press the end surface (a head) of the engaging pin 9 in a state where the engaging pin 9 has been passed through the pin holes 31f, 32k.

As to the specific configuration, the pin slip-out preventing piece 31h has a pin contact part 31i that presses the end surface of the engaging pin 9 and a flexible part 31j that extends between the pin contact part 31i and the mating wall 31g. The width of the pin contact part 31i (the dimension thereof in the vehicle body front-rear direction) is set to be larger than the width of the flexible part 31j to secure a wide range in which the pin contact part 31i presses the end surface of the engaging pin 9. Only a lower end portion of the flexible part 31j is integrally molded with the mating wall 31g, and the flexible part 31j can bend to the position away from the engaging pin 9 as indicated by the imaginary lines in FIG. 24.

The pin contact part 31i of the pin slip-out preventing piece 31h is provided with an inclined surface 31k of which the width increases toward the mating wall 31g. Thus, when inserting the engaging pin 9, a head of the engaging pin 9 presses the inclined surface 31k, causing the flexible part 31j of the pin slip-out preventing piece 31h to bend such that the pin contact part 31i moves backward from the pin hole 31f. When the head of the engaging pin 9 has passed over the pin contact part 31i, the inclined surface 31k is released from pressure and the flexible part 31j returns to its original shape, so that the pin contact part 31i presses the head of the engaging pin 9 and the engaging pin 9 is thereby prevented from slipping out.

Figure 26:
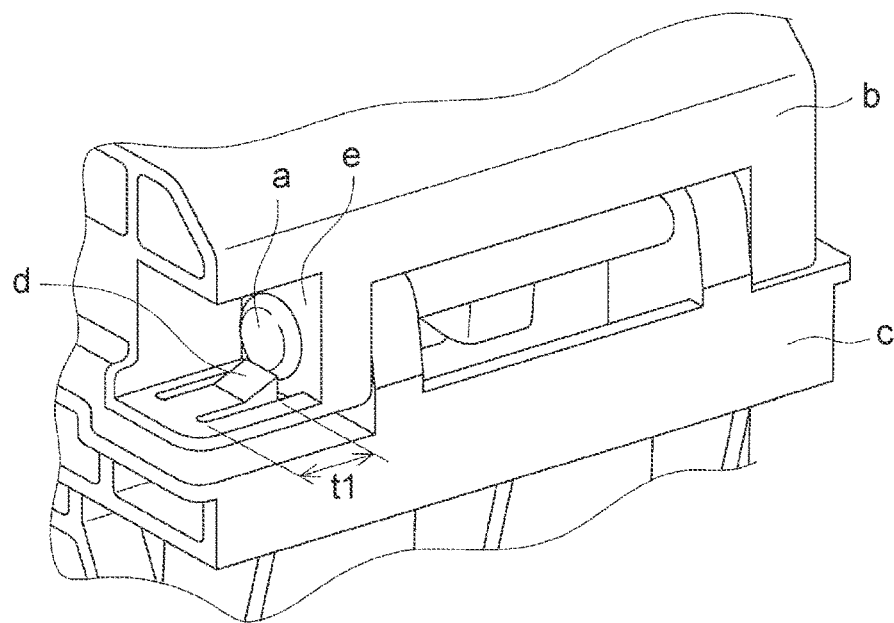
FIG. 26 is a perspective view showing a part at which an upper baseplate and a lower baseplate are engaged with each other by an engaging pin in a related art.

FIG. 26 is a perspective view showing a part at which an upper baseplate b and a lower baseplate c are engaged with each other by an engaging pin a in a related art. As shown in FIG. 26, when a pin slip-out preventing piece d (the pin slip-out preventing piece d provided in the upper baseplate b) that presses an end surface of the engaging pin a extends in a direction orthogonal to an extension direction of a mating wall e (in an insertion direction of the engaging pin a), the dimension of the upper baseplate b in the insertion direction of the engaging pin a is increased by the length of the pin slip-out preventing piece d (the dimension thereof in the direction orthogonal to the extension direction of the mating wall e; the dimension t1 in FIG. 26). This results in an increase in the size of the baseplates b, c.

In the embodiment, by contrast, the pin slip-out preventing piece 31h extends in the direction along the extension direction of the mating wall 31g, and is configured to bend in the direction orthogonal to the insertion direction of the engaging pin 9, between the position away from the engaging pin 9 and the position covering the end surface of the engaging pin 9. Thus, the dimension of the pin slip-out preventing piece 31h in the insertion direction of the engaging pin 9 can be reduced and the size of the baseplate 3 can be reduced.

In the above configuration, of the mating walls 32m of the upper baseplate 32 and the mating walls 31g of the lower baseplate 31, the mating wall 31g of the lower baseplate 31 is located on the outer side in the pin passing direction, and the pin slip-out preventing piece 31h is integrally provided on this mating wall 31g. However, the present disclosure is not limited to this example, and the mating wall 32m of the upper baseplate 32 may be located on the outer side in the pin passing direction, and the pin slip-out preventing piece may be integrally provided on this mating wall 32m.

Modified Example of Pin Slip-Out Preventing Piece

Figure 27:
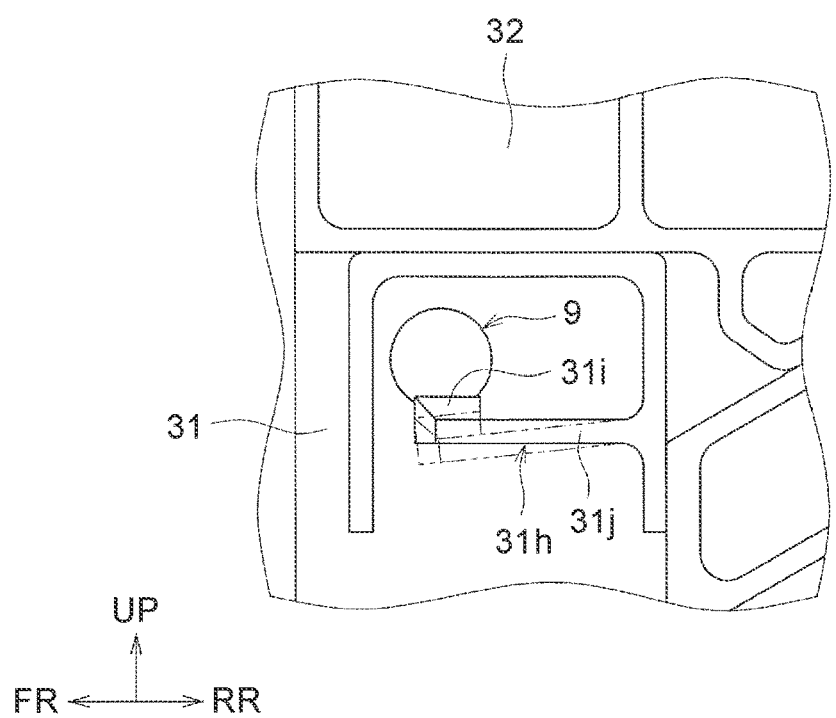
FIG. 27 is a view of a modified example corresponding to FIG. 24.

Next, a modified example of the pin slip-out preventing piece 31h will be described. FIG. 27 is a view of the modified example corresponding to FIG. 24.

In the above embodiment, the pin slip-out preventing piece 31h extends in a vertical direction orthogonal to the insertion direction of the engaging pin 9 (horizontal direction) and is configured to bend between the position away from the engaging pin 9 and the position covering the end surface of the engaging pin 9.

In this modified example, by contrast, as shown in FIG. 27, the pin slip-out preventing piece 31h extends in a horizontal direction orthogonal to the insertion direction of the engaging pin 9 (horizontal direction), and is configured to bend between a position away from the engaging pin 9 (a position on the lower side of and away from the engaging pin 9 as indicated by the imaginary lines in FIG. 27) and a position covering the end surface of the engaging pin 9.

This configuration has advantages similar to those of the embodiment. Namely, the dimension of the pin slip-out preventing piece 31h in the insertion direction of the engaging pin 9 can be reduced, and the size of the baseplate 3 can be reduced.

The pin slip-out preventing piece 31h bends away from the engaging pin 9 toward the lower side in this modified example, but the pin slip-out preventing piece 31h may instead bend away from the engaging pin 9 toward the upper side.

Effects of Embodiment

As described above, the spherical shaft member 23 of the shift lever 2 and the turning shaft parts 43 of the control lever 4 are separately supported by the baseplate 3. Specifically, the control lever 4 has the branched part 45 that is branched in the vehicle width direction above the spherical shaft member 23 so as to extend toward the turning shaft parts 43, and the turning shaft parts 43 are turnably supported by the parts of the baseplate 3 separate from the part that supports the spherical shaft member 23, on both outer sides of the spherical shaft member 23 in the vehicle width direction.

Thus, a reaction force to an operating force when the shift lever 2 is operated does not directly act on the turning shaft parts 43 of the control lever 4. It is therefore less likely that the turning shaft parts 43 will deform due to this reaction force such that the centerline extending between the turning shaft parts 43 curves. As a result, such deformation is less likely to add to the resistance to turning the control lever 4, so that degradation of the operability of the shift lever 2 and wear on the shift lever 2 due to an increase in local contact pressure can be avoided. Since there is no need to increase the distance between the turning shaft parts 43 to reduce the amount of deformation of the turning shaft parts 43, the size of the control lever 4 can be kept down. Moreover, since there is no need to increase the inside diameters of the support holes (the support holes formed by the lower support parts 34 and the upper support parts 35) of the baseplate 3 in which the turning shaft parts 43 are supported to reduce the resistance to turning, the turning shaft parts 43 can be kept from rattling.

The position at which the engaging projection 42 of the control lever 4 is engaged in the engaging opening 22*b* of the lever engaging member 22 and the position of the cable coupling part 44 are located substantially in the same plane, so that torsion of the control lever 4 due to an operating force from the shift lever 2 can be mitigated. Moreover, the position at which the engaging projection 42 is engaged in the engaging opening 22*b* and the position of the spherical shaft member 23 are located substantially in the same plane, so that torsion input into the spherical shaft member 23 can be reduced.

Since the protruding direction of the engaging projection 42 and the protruding direction of the cable coupling part 44 are opposite directions, the side toward which the engaging projection 42 moves out of the engaging opening 22*b* (when the travel mode is changed to the manual mode) and the side on which the work of mounting the cable 8 to the cable coupling part 44 is performed are the same side. Thus, a space around the control lever 4 can be effectively used, and the physical size of the shift device 1 can be reduced.

As described above, the centerline connecting the centers of turning of the turning shaft parts 43 of the control lever 4 passes through the center of the spherical shaft member 23, and the central portion of the cable coupling part 44 is located in or near the imaginary plane L2 that passes through the center of the spherical shaft member 23 and extends along the vehicle body front-rear direction. Thus, when the shift lever 2 is operated, the spherical shaft member 23 turns around a point on the centerline connecting the centers of turning of the turning shaft parts 43 of the control lever 4. Therefore, an angle to which the shift lever 2 is operated matches an angle to which the control lever 4 turns, so that the shift lever 2 and the control lever 4 do not shift relative to each other. This allows for good operability of the shift lever 2. Moreover, since the central portion of the cable coupling part 44 and the position at which the engaging projection 42 is engaged in the engaging opening 22*b* are located in or near the imaginary plane L2 passing through the center of the spherical shaft member 23 and extending along the vehicle body front-rear direction, the force acting on the control lever 4 in a direction of torsion can be reduced.

Other Embodiments

The present disclosure is not limited to the above embodiment and modified examples but can be modified and applied in all possible ways within the scope of claims and a scope equivalent to the scope of claims.

For example, in the above embodiment and modified examples, the automatic-mode gate opening 32*b* and the manual-mode gate opening 32*c* are disposed on the right side and the left side, respectively, in the vehicle width direction. However, the present disclosure is not limited to this example, and the automatic-mode gate opening and the manual-mode gate opening may be disposed on the left side and the right side, respectively, in the vehicle width direction.

In the above embodiment and modified examples, the shift device 1 is provided in the vehicle equipped with the automatic transmission capable of switching between the automatic mode and the manual mode, and is therefore configured such that the control lever 4 and the shift lever 2 can be disengaged from each other. Specifically, when the driver desires the manual mode and moves the shift lever 2, the engaging projection 42 of the control lever 4 is removed from the engaging opening 22*b* of the lever engaging member 22. However, the present disclosure is not limited to this example, and in the case of a shift device provided in a vehicle equipped with an automatic transmission that does not have the manual mode, the shift device may be configured such that the control lever 4 and the shift lever 2 cannot be disengaged from each other.

In the above embodiment and modified examples, the turning shaft parts 43 of the control lever 4 have the same configuration (the same outside diameter and the same thickness). However, the present disclosure is not limited to this example, and the turning shaft parts 43 may be different from each other in the outside diameter or the thickness. To allow the control lever 4 to turn appropriately, it is preferable that the centerline connecting the centers of turning of the turning shaft parts 43 pass through the center of the spherical shaft member 23 that is turnably supported by the lever holding member 33.

In the above embodiment and modified examples, the centerline L1 connecting the centers of turning of the turning shaft parts 43 of the control lever 4 passes through the center of the spherical shaft member 23, but the present disclosure is not limited to this example. In the above embodiment, the position of the groove (the groove to which one end portion of the cable 8 is coupled) 44*a* of the cable coupling part 44 of the control lever 4 is located in the imaginary plane L2 passing through the center of the spherical shaft member 23 and extending along the vehicle body front-rear direction, but the present disclosure is not limited to this example, either.

In the above embodiment and modified examples, the lower support parts 34 of the lower baseplate 31 have a circular arc shape matching the shape of the outer circumferential edge of the turning shaft part 43 of the control lever 4 as seen from the vehicle width direction, and the protrusions 36 protruding toward the center of turning of the turning shaft part 43 are provided on the inner surfaces of the upper support parts 35 of the upper baseplate 32. However, the present disclosure is not limited to this example. The upper support parts 35 of the upper baseplate 32 may have a circular arc shape matching the shape of the outer circumferential edge of the turning shaft part 43 of the control lever 4 as seen from the vehicle width direction, and a plurality of protrusions protruding toward the center of turning of the turning shat part 43 may be provided on the inner surfaces of the lower support parts 34 of the lower baseplate 31. Alternatively, both of the lower support parts 34 of the lower baseplate 31 and the upper support parts 35 of the upper baseplate 32 may have a circular arc shape matching the shape of the outer circumferential edge of the turning shaft part 43 of the control lever 4 as seen from the vehicle width direction.

The present embodiment is applicable to a shift device provided in a vehicle equipped with an automatic transmission.

What is claimed is:
1. A shift device for a vehicle, the shift device comprising:
a baseplate supported by a vehicle body;

a shift lever having a spherical shaft part at a lower end; and a control lever connected to the shift lever, the control lever being configured to transmit an operating force input into the shift lever in a vehicle body front-rear direction to a transmission through a cable, wherein:

the spherical shaft part of the shift lever is supported by the baseplate and configured to turn relative to the baseplate;

the control lever includes a lever main body;

a cable coupling part to which the cable is coupled is provided at an upper part of the control lever, the cable coupling part connected to the lever main body;

a turning shaft part supported by the baseplate is provided at a lower part of the control lever outward of the spherical shaft part of the shift lever in a vehicle width direction, and the turning shaft part is configured to turn relative to the baseplate;

the control lever has a branched part that is directly connected to and between the lever main body and the turning shaft part, a lower end of the lever main body directly connected to an uppermost end of the branched part and an upper end of the turning shaft part directly connected to a lowermost end of the branched part; and the branched part is located above the spherical shaft part and branched in the vehicle width direction from the lower end of the lever main body so as to extend toward, in the vehicle width direction, and directly connect to the upper end of the turning shaft part.

2. The shift device for the vehicle according to claim 1, wherein:

the shift lever and the control lever are connected to each other so that an engaging projection formed on the control lever is inserted and engaged into an engaging opening formed in the shift lever;

a protruding direction of the engaging projection formed on the control lever and a protruding direction of the cable coupling part are opposite directions; and a position at which the engaging projection is engaged in the engaging opening, a position of the spherical shaft part, and a position of the cable coupling part are located in the same plane.

3. The shift device for the vehicle according to claim 2, wherein:

a line extending from the turning shaft part of the control lever along the vehicle width direction passes through a center of the spherical shaft part; and a central portion of the cable coupling part and the position at which the engaging projection is engaged in the engaging opening are located in or near an imaginary plane that passes through the center of the spherical shaft part and extends along the vehicle body front-rear direction.

4. The shift device for the vehicle according to claim 1, wherein:

the baseplate is provided with a gate having an opening that guides shifting operation of the shift lever;

a cushion member that is a part separate from the baseplate and made of a material softer than a material composing the baseplate is installed along an edge of the opening of the gate;

the shift lever is provided with a detent pin configured to move upward and downward and constituting a detent mechanism that functions to position the shift lever at each shift position of the shift lever;

the cushion member has a detent cushion that extends downward so as to come into contact with the detent pin in a state where the detent pin has reached a raised position; and the detent cushion has an engaging projection that engages with the baseplate and an opening that is formed above the engaging projection.

5. The shift device for the vehicle according to claim 4, wherein the baseplate is provided with an insertion hole into which the detent cushion of the cushion member is inserted, and a clearance is left between a vertical wall forming an inner surface of the insertion hole and a side surface of the detent cushion facing the vertical wall.

6. The shift device for the vehicle according to claim 4, wherein the cushion member includes a shift gate cushion that covers the edge of the opening of the gate, and further includes the detent cushion, the detent cushion includes a body that extends downwards from the shift gate cushion, the engaging projection extends from the body of the detent cushion in the vehicle width direction, and the opening, that is formed above the engaging projection, extends in the vehicle width direction through the body.

7. The shift device for the vehicle according to claim 1, wherein the shift device further comprises an additional turning shaft part that is supported by the baseplate and is provided at the lower part of the control lever outward of the spherical shaft part of the shift lever in an additional vehicle width direction that is opposite to the vehicle width direction, and the additional turning shaft part is configured to turn relative to the baseplate, the control lever further has an additional branched part that is directly connected to and between the lever main body and the additional turning shaft part, the lower end of the lever main body directly connected to an uppermost end of the additional branched part and an upper end of the additional turning shaft part directly connected to a lowermost end of the additional branched part; and the additional branched part is located above the spherical shaft part and branched in the additional vehicle width direction from the lower end of the lever main body so as to extend toward, in the additional vehicle width direction, and directly connect to the upper end of the additional turning shaft part.

8. The shift device for the vehicle according to claim 1, wherein:

an outer circumferential edge of the turning shaft part of the control lever has a circular shape as seen from the vehicle width direction;

the baseplate is formed by integrally combining an upper baseplate and a lower baseplate, the upper baseplate having an upper support part that supports the turning shaft part along an upper side of the outer circumferential edge, the lower baseplate having a lower support part that supports the turning shaft part along a lower side of the outer circumferential edge;

at least one of the upper support part of the upper baseplate and the lower support part of the lower baseplate has a circular arc shape matching a shape of the outer circumferential edge of the turning shaft part as seen from the vehicle width direction; and the lower baseplate is provided with a temporary holding part on which, before the spherical shaft part of the shift lever is installed, the control lever that has been turned toward one side so as to be away from an installation path of installing the spherical shaft part is placed and temporarily held.

9. A shift device for a vehicle, the shift device comprising:
a baseplate supported by a vehicle body;
a shift lever having a spherical shaft part at a lower end; and
a control lever connected to the shift lever, the control lever being configured to transmit an operating force input into the shift lever in a vehicle body front-rear direction to a transmission through a cable, wherein:
the spherical shaft part of the shift lever is supported by the baseplate and configured to turn relative to the baseplate;
a cable coupling part to which the cable is coupled is provided at an upper part of the control lever;
a turning shaft part supported by the baseplate is provided at a lower part of the control lever outward of the spherical shaft part of the shift lever in a vehicle width direction, and the turning shaft part is configured to turn relative to the baseplate;
the control lever has a branched part between the cable coupling part and the turning shaft part;
the branched part is located above the spherical shaft part and branched in the vehicle width direction so as to extend toward the turning shaft part;
the baseplate is formed by integrally combining an upper baseplate and a lower baseplate, the upper baseplate having an upper support part that supports the turning shaft part along an upper side of an outer circumferential edge of the turning shaft part, the lower baseplate having a lower support part that supports the turning shaft part along a lower side of the outer circumferential edge;
each of the upper baseplate and the lower baseplate is provided with a mating wall in which a pin hole is formed, and the upper baseplate and the lower baseplate are integrally combined so that each of the mating walls is overlapped with each other and an engaging pin is passed through each of the pin holes;
one of the mating wall of the upper baseplate and the mating wall of the lower baseplate that is located on an outer side in a pin passing direction is integrally provided with a pin slip-out preventing piece extending in a direction along an extension direction of the mating wall, and
the pin slip-out preventing piece is configured to bend in a direction orthogonal to an insertion direction of the engaging pin, between a position away from the engaging pin and a position covering an end surface of the engaging pin, and press the end surface of the engaging pin in a state where the engaging pin has been passed through the pin holes.

10. A shift device for a vehicle, the shift device comprising:
a baseplate supported by a vehicle body;
a shift lever having a spherical shaft part at a lower end; and
a control lever connected to the shift lever, the control lever being configured to transmit an operating force input into the shift lever in a vehicle body front-rear direction to a transmission through a cable, wherein:
the spherical shaft part of the shift lever is supported by the baseplate and configured to turn relative to the baseplate;
a cable coupling part to which the cable is coupled is provided at an upper part of the control lever;
a turning shaft part supported by the baseplate is provided at a lower part of the control lever outward of the spherical shaft part of the shift lever in a vehicle width direction, and the turning shaft part is configured to turn relative to the baseplate;
the control lever has a branched part between the cable coupling part and the turning shaft part;
the branched part is located above the spherical shaft part and branched in the vehicle width direction so as to extend toward the turning shaft part;
the shift lever is provided with a detent pin configured to move upward and downward and constituting a detent mechanism that functions to position the shift lever at each shift position of the shift lever;
a shift lock unit that restricts movement of the shift lever by restricting upward and downward movement of the detent pin is installed on the baseplate;
a shift lock case of the shift lock unit is provided with a boss that extends in a horizontal direction so as to support a shift lock link that restricts upward and downward movement of the detent pin by coming into contact with the detent pin in a shift lock state where movement of the shift lever is restricted, and the shift lock link is configured to turn relative to the boss;
the baseplate is provided with a boss receiving part on which the boss is placed and supported; and
a part of the boss that comes into contact with the boss receiving part is formed by a flat surface, and the boss receiving part is formed by a protrusion having a flat surface on which the flat surface of the boss is laid.

* * * * *